United States Patent [19]
Sasano et al.

[11] Patent Number: 5,671,027
[45] Date of Patent: *Sep. 23, 1997

[54] LCD DEVICE WITH TFTS IN WHICH PIXEL ELECTRODES ARE FORMED IN THE SAME PLANE AS THE GATE ELECTRODES WITH ANODIZED OXIDE FILMS AND BEFORE THE DEPOSITION OF THE SILICON GATE INSULATOR

[75] Inventors: Akira Sasano, Tokyo; Kazuo Shirahashi, Mobara; Yuka Matsukawa, Mobara; Hideaki Taniguchi, Mobara; Hideaki Yamamoto, Tokorozawa; Haruo Matsumaru, Tokyo, all of Japan

[73] Assignee: Hitachi, Ltd., Tokyo, Japan

[*] Notice: The term of this patent shall not extend beyond the expiration date of Pat. No. 5,402,254.

[21] Appl. No.: 509,821

[22] Filed: Aug. 1, 1995

Related U.S. Application Data

[60] Continuation of Ser. No. 411,207, Mar. 27, 1995, Pat. No. 5,610,738, which is a division of Ser. No. 156,640, Nov. 24, 1993, Pat. No. 5,402,254, which is a division of Ser. No. 778,562, Oct. 17, 1991, abandoned.

[30] Foreign Application Priority Data

Oct. 17, 1990 [JP] Japan ............ 2-276173
Nov. 29, 1990 [JP] Japan ............ 2-325995

[51] Int. Cl.⁶ .......... G02F 1/136; G02F 1/1343
[52] U.S. Cl. .......... 349/46; 349/38
[58] Field of Search .......... 359/59, 54, 79, 359/87, 88; 257/59; 349/122, 138, 38, 39, 43, 46

[56] References Cited

U.S. PATENT DOCUMENTS

| | | | |
|---|---|---|---|
| 3,824,003 | 7/1974 | Koda et al. | 359/59 |
| 4,215,156 | 7/1980 | Dalal et al. | 357/715 |
| 4,386,352 | 5/1983 | Nonomura et al. | 340/784 |
| 4,431,271 | 2/1984 | Okubo | 350/334 |

(List continued on next page.)

FOREIGN PATENT DOCUMENTS

| | | |
|---|---|---|
| 55-000530 | 1/1980 | Japan. |
| 56-077887 | 6/1981 | Japan. |
| 57-049994 | 3/1982 | Japan. |
| 58-144888 | 8/1983 | Japan. |

(List continued on next page.)

OTHER PUBLICATIONS

IEEE Transactions on Electron Devices, vol. ED-20, No. 11, pp. 995–997, Nov. 1973, T. Brody, et al., "A 6×6 Inch 20 Lines–per–Inch Liquid–Crystal Display Panel", Proceedings of the SID, vol. 31/1, 1990, pp. 13–17. No Month.

IEEE sponsored 1988 Int'l. Display Research Conf., Oct. 1988, 88–CH–2678–1, pp. 155–158, Takeda, et al., "An Amorphous Si TFT Array with TaOx/SiNx Double Layered Insulator for Liquid Crystal Display". No Month.

IEEE–IEDM, Dec. 1990, H. Yamamoto, et al., "A New a–Si TFT with $Al_2O_3$/SiN Double–Layered Gate Insulator for 10.4–inch Diagonal Multicolor Display", pp. 851–854.

Primary Examiner—William L. Sikes
Assistant Examiner—Tiep H. Nguyen
Attorney, Agent, or Firm—Antonelli, Terry, Stout & Kraus, LLP.

[57] ABSTRACT

An active matrix liquid crystal display device, with a plurality of thin-film transistors provided over a glass substrate each including an anodized oxide film of aluminum gate electrode, in which transparent pixel electrodes are formed in the same plane as the gate electrodes between the glass substrate and amorphous silicon islands over which source and drain electrodes are provided.

70 Claims, 20 Drawing Sheets

U.S. PATENT DOCUMENTS

| | | | |
|---|---|---|---|
| 4,537,471 | 8/1985 | Grinberg | 350/333 |
| 4,582,395 | 4/1986 | Morozumi | 350/334 |
| 4,602,850 | 7/1986 | DeBenedetti | 350/333 |
| 4,639,087 | 1/1987 | Cannella | 350/332 |
| 4,653,862 | 3/1987 | Morozumi | 359/68 |
| 4,678,282 | 7/1987 | Yaniv et al. | 350/333 |
| 4,728,172 | 3/1988 | Cannella | 350/332 |
| 4,728,175 | 3/1988 | Baron | 350/336 |
| 4,759,610 | 7/1988 | Yanagisawa | 350/334 |
| 4,762,398 | 8/1988 | Yasui et al. | 359/59 |
| 4,773,737 | 9/1988 | Yokono et al. | 350/333 |
| 4,775,861 | 10/1988 | Saito | 359/59 |
| 4,778,560 | 10/1988 | Takeda et al. | 359/59 |
| 4,786,148 | 11/1988 | Sekimura et al. | 359/79 |
| 4,816,885 | 3/1989 | Yoshida et al. | 357/23.7 |
| 4,821,092 | 4/1989 | Noguchi | 359/59 |
| 4,824,213 | 4/1989 | Morokawa | 359/54 |
| 4,845,482 | 7/1989 | Howard et al. | 359/55 |
| 4,909,602 | 3/1990 | Kaneko et al. | 359/59 |
| 4,936,656 | 6/1990 | Yamashita et al. | 350/333 |
| 4,938,566 | 7/1990 | Takeda et al. | 359/55 |
| 4,955,697 | 9/1990 | Tsukada et al. | 359/57 |
| 5,028,122 | 7/1991 | Hamada et al. | 359/59 |
| 5,032,531 | 7/1991 | Tsutsui et al. | 437/40 |
| 5,054,887 | 10/1991 | Kato | 359/59 |
| 5,132,820 | 7/1992 | Someya et al. | 359/59 |
| 5,151,807 | 9/1992 | Katayama et al. | 359/59 |
| 5,187,602 | 2/1993 | Ikeda et al. | 359/59 |
| 5,331,447 | 7/1994 | Someya et al. | 359/59 |
| 5,402,254 | 3/1995 | Sasano et al. | 359/59 |
| 5,459,596 | 10/1995 | Ueda et al. | 359/54 |
| 5,477,357 | 12/1995 | Suzuki et al. | 359/79 |
| 5,483,082 | 1/1996 | Takizawa et al. | 359/59 |
| 5,483,366 | 1/1996 | Atherton | 359/87 |
| 5,499,123 | 3/1996 | Mikoshiba | 359/54 |

FOREIGN PATENT DOCUMENTS

| | | | |
|---|---|---|---|
| 59-078388 | 5/1984 | Japan . | |
| 59-119322 | 7/1984 | Japan . | |
| 60-017962 | 1/1985 | Japan . | |
| 60-097332 | 5/1985 | Japan . | |
| 60-230117 | 11/1985 | Japan . | |
| 61-067095 | 4/1986 | Japan . | |
| 61-077886 | 4/1986 | Japan . | |
| 61-121034 | 6/1986 | Japan . | |
| 0184517 | 8/1986 | Japan | 359/59 |
| 62-44717 | 2/1987 | Japan . | |
| 62-091993 | 4/1987 | Japan . | |
| 0269120 | 11/1987 | Japan | 359/59 |
| 0218926 | 9/1988 | Japan | 359/59 |
| 0136124 | 5/1989 | Japan | 359/79 |
| 0248136 | 10/1989 | Japan | 359/79 |
| 0267618 | 10/1989 | Japan | 359/79 |
| 0106723 | 4/1990 | Japan | 359/59 |
| 2-179616 | 7/1990 | Japan . | |
| 2133602 | 7/1984 | United Kingdom . | |

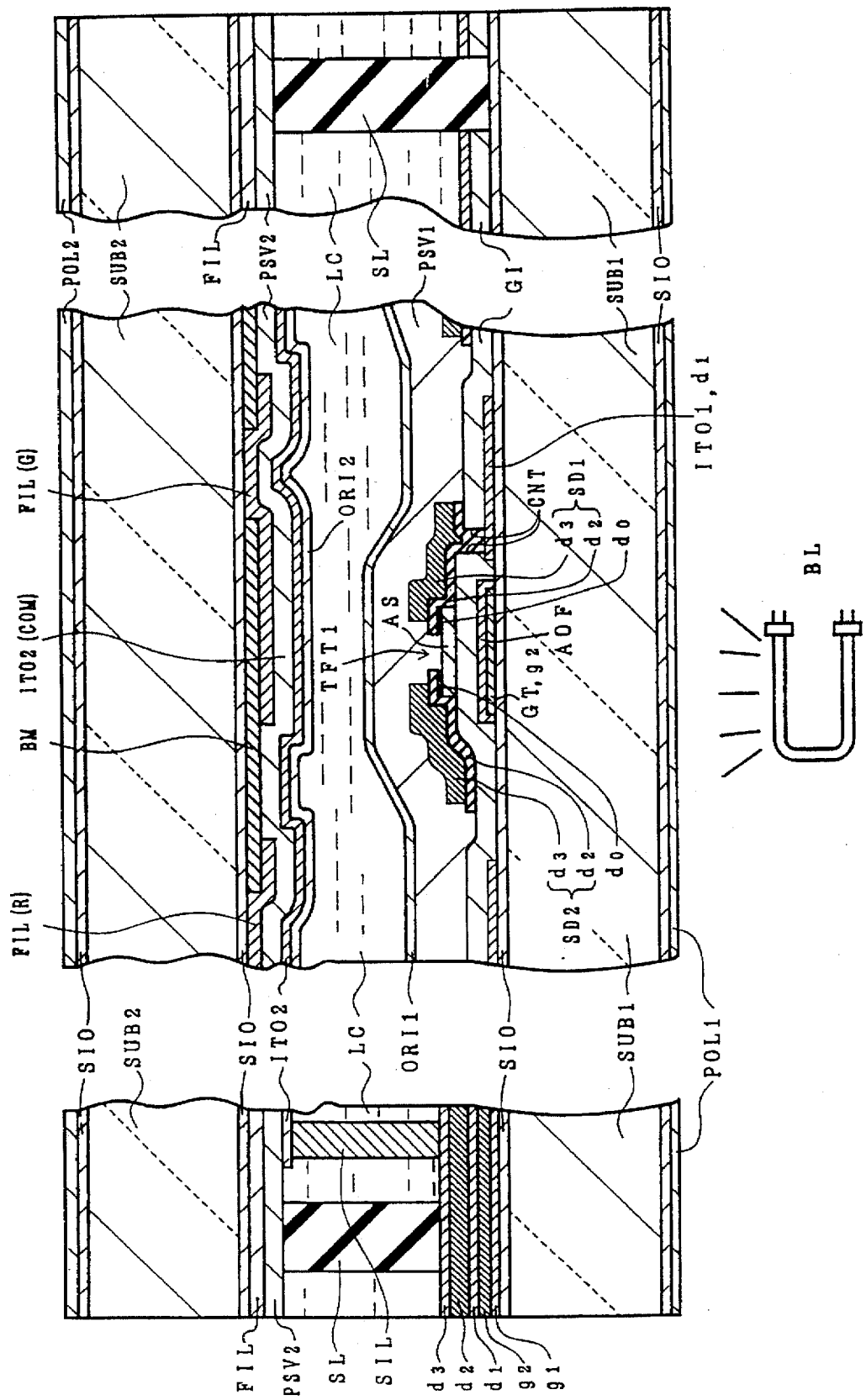

LCD DEVICE WITH TFTS IN WHICH PIXEL ELECTRODES ARE FORMED IN THE SAME PLANE AS THE GATE ELECTRODES WITH ANODIZED OXIDE FILMS AND BEFORE THE DEPOSITION OF THE SILICON GATE INSULATOR

This is a continuation of application Ser. No. 08/411,207, filed Mar. 27, 1995; which is a divisional of application Ser. No. 08/156,640, filed Nov. 24, 1993, now U.S. Pat. No. 5,402,254; and which, in turn, is a divisional of application Ser. No. 07/778,562, filed Oct. 17, 1991, now abandoned.

BACKGROUND OF THE INVENTION

1. Field of The Invention

This invention relates to a method for manufacturing a liquid crystal display device, particularly a liquid crystal display device of an active matrix type using thin film transistors, or the like.

2. Description of The Prior Arts

In a liquid crystal display device of an active matrix type, non-linear devices (switching devices) are disposed in such a manner as to correspond to a plurality of pixel electrodes arranged in matrix, respectively. The liquid crystal in each pixel is always driven, in principle, (a duty ratio of 1.0). In comparison with a so-called "simple matrix type" which employs a time division driving system, therefore, the active system has better contrast and has become an indispensable technique particularly in a color liquid crystal display device. A typical example of the switching devices is a thin film transistor (TFT).

FIG. 17 is a sectional view showing part of a conventional active matrix type liquid crystal display device. In this liquid crystal display device, a gate electrode GT is disposed on a transparent glass substrate SUB1, an insulating film GI used as a gate insulating film is disposed on the gate electrode GT, an i-type semiconductor layer AS is disposed on the insulating film GI, a video signal line DL is disposed on the insulating film GI, a source electrode SD11 and a drain electrode SD21 are disposed on both sides of the i-type semiconductor layer AS and a transparent pixel electrode ITO11 is disposed and connected with the source electrode SD11.

FIG. 18 is a sectional view showing part of another conventional active matrix type liquid crystal display device (Proceedings of the SID, Vol. 31/1, 1990, pp 13–17). In this liquid crystal display device, a gate electrode GT is disposed a transparent glass substrate SUB1, an insulating film GI1 consisting of a silicon nitride film is disposed on the gate electrode GT, a transparent pixel electrode ITO12 is disposed on the insulating film GI1, an insulating film GI2 consisting of a silicon nitride film is disposed on the transparent pixel electrode ITO12, an i-type semiconductor layer AS is disposed on the insulating film GI12, a video signal line DL is disposed on the insulating film GI12, a source electrode SD11 and a drain electrode SD21 are disposed on both sides of the i-type semiconductor layer AS, and the source electrode SD11 and the transparent pixel electrode ITO11 are connected through a through hole bored in the insulating film GI2.

In the liquid crystal display device shown in FIG. 17, the video signal line DL and the transparent pixel electrode ITO11 are formed on the same plane. Accordingly, the video signal line DL and the transparent pixel electrode ITO11 adjacent to each other undergo short-circuit and invite point defects and deterioration of display performance.

In the liquid crystal display device shown in FIG. 18, the video signal line DL and the transparent pixel electrode ITO12 are not formed on the same plane. Accordingly, the video signal line DL and the transparent pixel electrode ITO12 hardly shortcircuit. However, two layers of insulating films GI1 and GI2 are disposed and if these insulating films GI1, GI2 are formed by a plasma CVD process, generation of dust due to the plasma reaction is extremely great inside a plasma CVD apparatus, so that defects are likely to occur in the insulating films GI1, GI2. For example, short circuits occur between the gate electrode GT and the source and drain electrodes SD11, SD21. Therefore, point defects occur and display performance deteriorates.

SUMMARY OF THE INVENTION

In order to solve the problems described above, the present invention is directed to provide a liquid crystal display device having excellent display performance.

In a liquid crystal display device of an active matrix system using a thin film transistor and a pixel electrode as a constituent element of a pixel, the object of the invention described above can be accomplished by the construction in which a first insulating film consisting of an anodized oxide film of a metal constituting a gate electrode of the thin film transistor is disposed on the gate electrode, and a second insulating film used as a gate insulating film of the thin film transistor and different from the first insulating film is formed between the pixel electrode and a video signal line.

In this case, the gate insulating film of the thin film transistor may be constituted by the first insulating film and the second insulating film.

The pixel electrode described above may be formed on the same plane as the gate electrode.

Furthermore, in a liquid crystal display device of an active matrix system using a thin film transistor and a pixel electrode as a constituent element of a pixel, the liquid crystal display device of the invention is characterized in that a third insulating film used as the gate insulating film of the thin film transistor described above is formed between the pixel electrode and a video signal line, and the third insulating film on the pixel electrode is removed substantially.

In a liquid crystal display device of an active matrix system using a thin film transistor and a pixel electrode as a constituent element of a pixel, the liquid crystal display device of the invention is characterized in that an isolated pattern consisting of a silicon film is formed on at least part of the peripheral portion of a hole bored in a fourth insulating film used as a gate insulating film of the thin film transistor described above and consisting of a silicon nitride film.

In the liquid crystal display device of the present invention, the second insulating film is formed between the pixel electrode and the video signal line to avoid a short circuit between them.

If the gate insulating film of the thin film transistor is constituted by the first insulating film and the second insulating film described above, the short-circuit between electrodes at the thin film transistor portion can be prevented.

Furthermore, if the pixel electrode is formed on the same plane as the gate electrode, the number of insulating films can be reduced.

In the liquid crystal display device of the present invention, the third insulating film used as the gate insulating film of the thin film transistor is formed between the pixel electrode and the video signal line. Accordingly, the pixel electrode and the video signal line do not short-circuit. Since the third insulating film on the pixel electrode is removed substantially, the total film thickness of the insulating films formed on the pixel electrode becomes smaller.

Furthermore, in the liquid crystal display device of the present invention, the isolated pattern consisting of the silicon film is formed on at least part of the periphery of the hole bored in the fourth insulating film used as the gate insulating film of the thin film transistor and consisting of the silicon nitride film. Accordingly, the edge surface of the hole becomes a slope surface.

BRIEF DESCRIPTION OF THE DRAWINGS

FIG. 2A is a section taken along line IIA—IIA of FIG. 1A and showing a peripheral portion of the seal portion.

DESCRIPTION OF THE PREFERRED EMBODIMENTS

Figure 1:
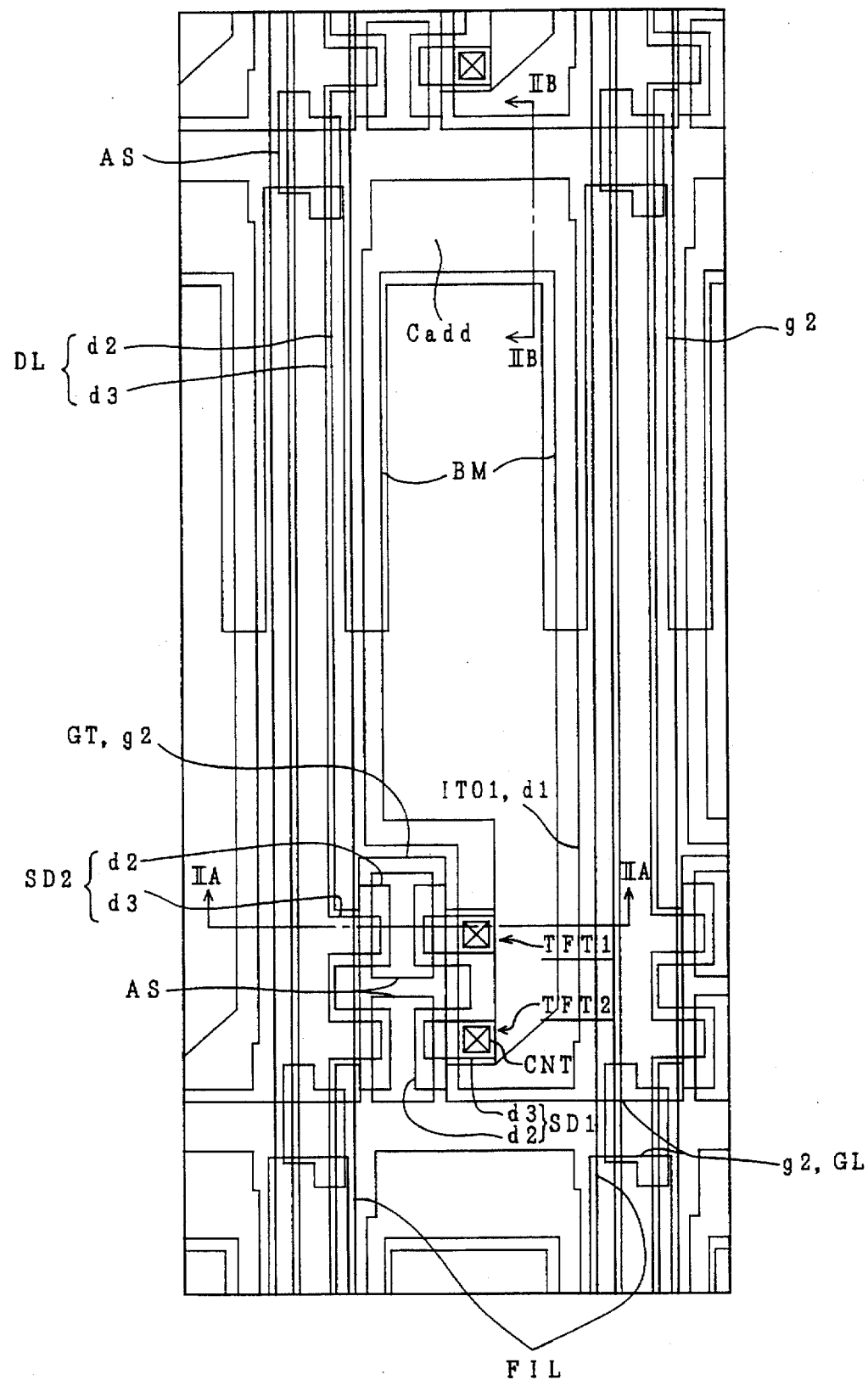
FIG. 1 is a top plan view showing an essential portion of one pixel of the liquid crystal display of the color liquid crystal display circuit of active matrix type, to which the present invention is to be applied.

Here will be described in the following the construction of the present invention with embodiments of a color liquid crystal display circuit of active matrix type, to which the present invention is be applied.

Incidentally, the parts having identical functions are designated at identical reference characters throughout all the Figures for describing embodiments, and their repeated descriptions will be omitted.

Figure 2B:
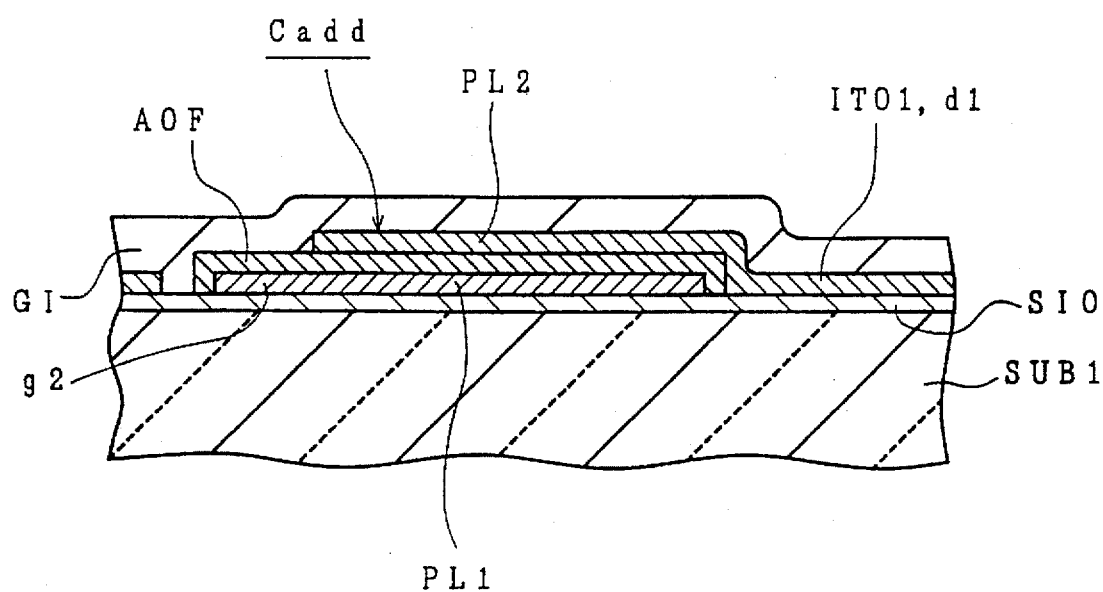
FIG. 2B is a section taken along line IIB—IIB of FIG. 1.
Figure 2C:
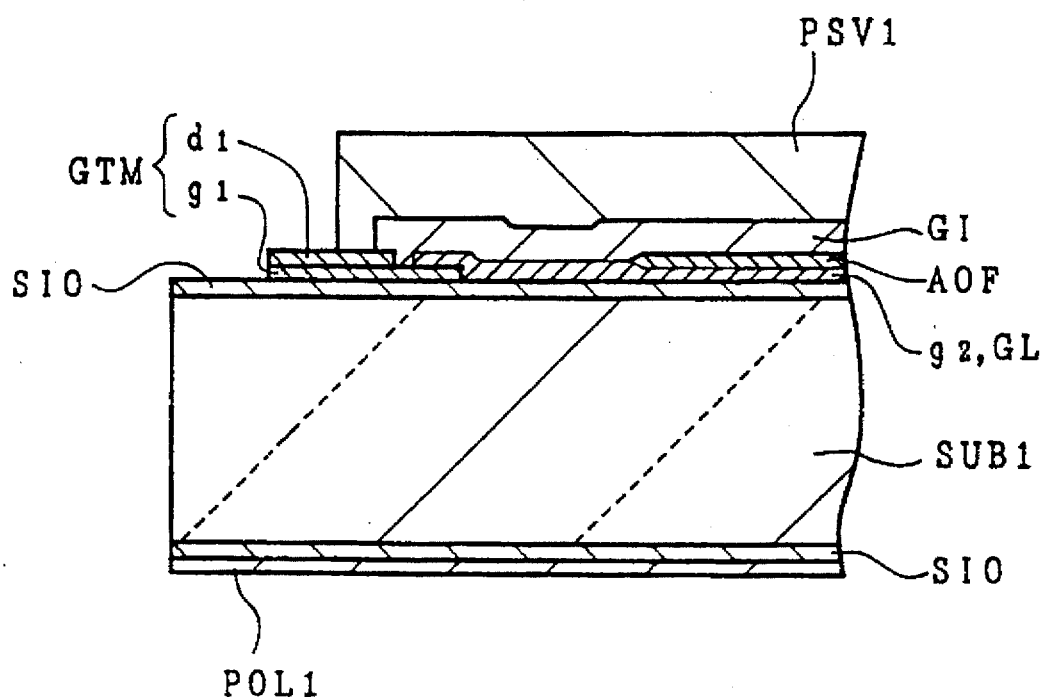
FIG. 2C is a sectional view illustrating a portion of a gate terminal of the liquid crystal display device shown in FIG. 1.
Figure 3:
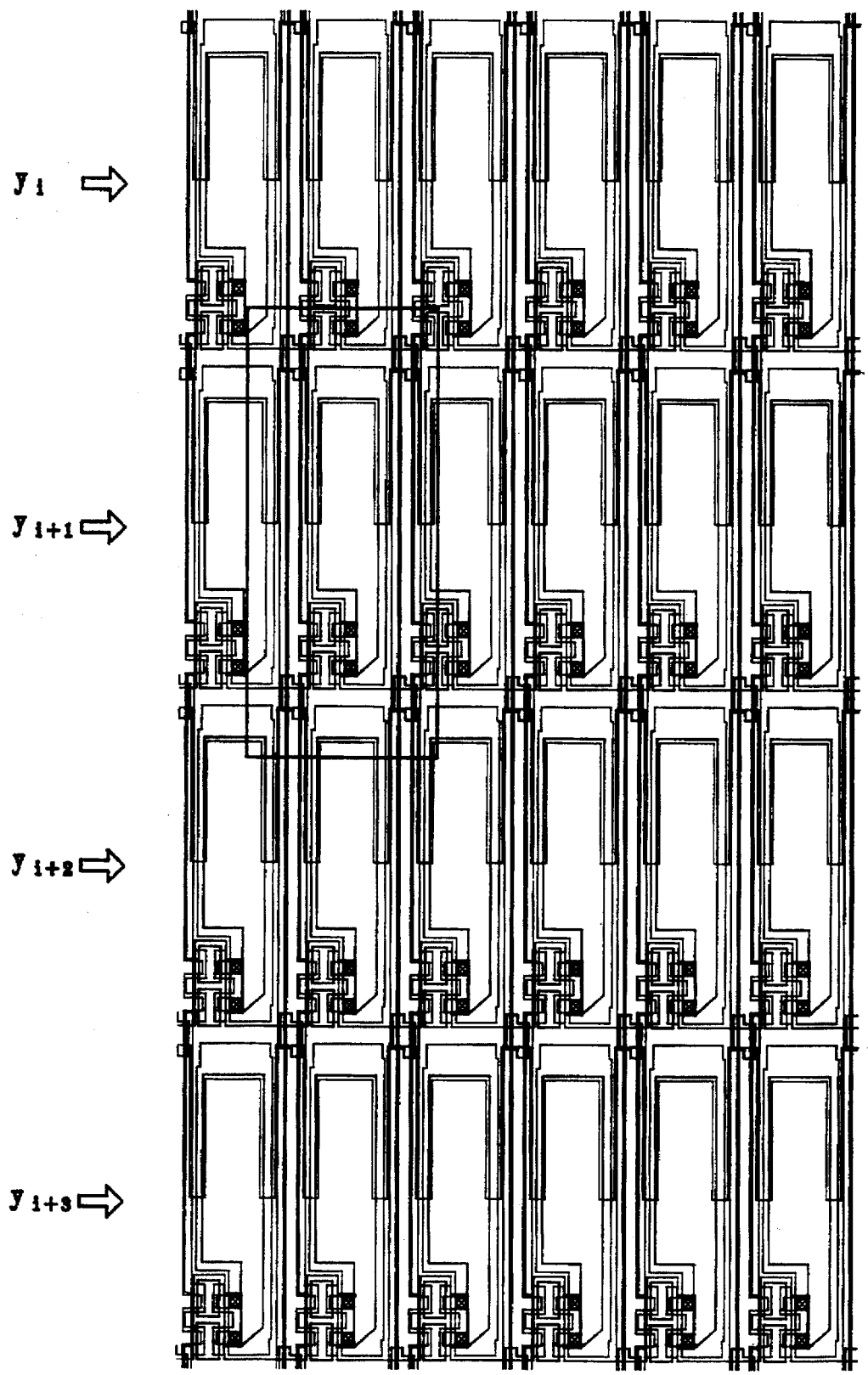
FIG. 3 is a top plan view showing an essential portion of a liquid crystal display circuit arranged with a plurality of pixels shown in FIG. 1.

FIG. 1 is a top plan view showing one embodiment of one pixel and its peripheral portion of the active matrix type color liquid crystal display circuit to which the present invention is to be applied. FIG. 2A is a section taken along line IIA—IIA of FIG. 1 and shows the embodiment and the vicinity of the sealing portion of the display panel. FIG. 2B is a section taken along IIB—IIB of FIG. 1 and shows the embodiment. On the other hand, FIG. 3 (showing an essential portion is a top plan view) is a top plan view showing one embodiment in case a number of pixels shown in FIG. 1 are arranged.

Pixel Arrangement

As shown in FIG. 1, each pixel is arranged in a cross region (defined by four signal lines, i.e., two operation signal lines and two video signal lines) between two adjacent operation signal lines (e.g., gate signal lines or horizontal signal lines) GL and two video signal lines (e.g., drain signal lines or vertical signal lines) DL. Each pixel includes a thin film transistor TFT, a pixel electrode ITO1 and an additional capacitor Cadd. The scanning signal lines GL are extended in the column direction and arranged in plurality in the row direction. The video signal lines DL are extended in the row direction and arranged in plurality in the column direction.

Overall Structure of Panel Section

As shown in FIG. 2A, the thin film transistor TFT and the transparent pixel electrode ITO1 are formed at the side of a lower transparent glass substrate SUB1 across a liquid crystal layer LC, and a color film FIL and a black matrix pattern BM for light shielding are formed at the side of an upper transparent glass substrate SUB2. The side of the lower transparent glass substrate SUB1 is made to have a thickness of about 1.1 (mm), for example.

On the both surfaces of each of transparent glass substrate SUB1 and SUB2 are formed silicon oxide layers SIO deposited by dip treatment. Accordingly, even if there exist sharp defects at the surfaces of the transparent glass substrates SUB1 and SUB2, the scanning signal lines GL as well as the color filter FIL are protected from defects since the defects are covered by the silicon oxide layer SIO.

FIG. 2A presents a section of one pixel portion at its center and a section of the portion, i.e., the lefthand side edges of the transparent glass substrates SUB1 and SUB2, in which the external leading-out wires are present, at its lefthand side. The righthand side presents a section of a portion, i.e., the righthand side edges of the transparent glass substrates SUB1 and SUB2, in which the leading-out wires are absent.

Sealing members SL, as indicated at the lefthand and righthand sides of FIG. 2A, are made to seal up the liquid crystal LC and are formed along the whole edges of the transparent glass substrates SUB1 and SUB2 excepting the liquid crystal sealing port (although not shown). The sealing members SL are made of an epoxy resin, for example.

A common transparent, pixel electrode ITO2 at the side of the aforementioned upper transparent glass substrate SUB2 has its at at least one portion connected with the external leading-out wire, which is formed at the side of the lower transparent glass substrate SUB1, by means of silver paste SIL. This leading-out wire is formed at the fabrication step shared with the aforementioned gate electrode GT, source electrode SD1 and drain electrode SD2.

The individual layers of alignment films ORI1 and ORI2, transparent pixel electrode ITO1, common transparent pixel electrode ITO2, passivation films PSV1 and PSV2 and insulating film GI are formed inside of the sealing member SL. Polarizers POL1 and POL2 are formed on the individual outer surfaces of the lower transparent glass substrate SUB1 and the upper transparent glass substrate SUB2.

A liquid crystal LC is filled between the lower alignment film ORI1 and upper alignment film ORI2 for setting the orientations of the liquid crystal molecules and is sealed with the sealing member SL.

The lower alignment film ORI1 is formed over the passivation film PSV1 at the side of the lower transparent glass substrate SUB1.

On the surface of the inside (at the liquid crystal side) of the upper transparent glass substrate SUB2, there are sequentially laminated a shielding film BM, a color filter FIL, a passivation film PSV2, a common transparent pixel electrode (COM) ITO2 and an upper alignment film ORI2.

This liquid crystal display circuit is assembled by forming the individual layers at the sides of the lower transparent glass substrate SUB1 and the upper transparent glass substrate SUB2, by subsequently superposing the upper and lower transparent glass substrates SUB1 and SUB2, and by filling the liquid crystal LC between the two.

Thin Film Transistor TFT

If a positive bias is applied to the gate electrode GT, the thin film transistor TFT has its channel resistance reduced between its source and drain. If the bias is reduced to zero, the thin film transistor TFT operates to have its channel resistance increased.

The thin film transistor TFT of each pixel is divided into two (or plurality) in the pixel so that it is composed of thin film transistors (or divided thin film transistors) TFT1 and TFT2. These thin film transistors TFT1 and TFT2 are individually made to have a substantially equal size (in the channel length and width). Each of these divided thin film transistors TFT1 and TFT2 is composed mainly of a gate electrode GT, a gate insulating film GI, an i-type (i.e., intrinsic type not doped with a conductivity type determining impurity) amorphous Si semiconductor layer AS, and a pair of source electrode SD1 and drain electrode SD2. Incidentally, the source and drain are intrinsically determined in dependence upon the bias polarity inbetween, and this polarity is inverted during the operation in the circuit of the present display circuit. Thus, it should be understood that the source and drain are interchanged during the operation. In the following description, however, one is fixed as the source whereas the other is fixed as the drain, for conveniences only.

Gate Electrode GT

Figure 4:
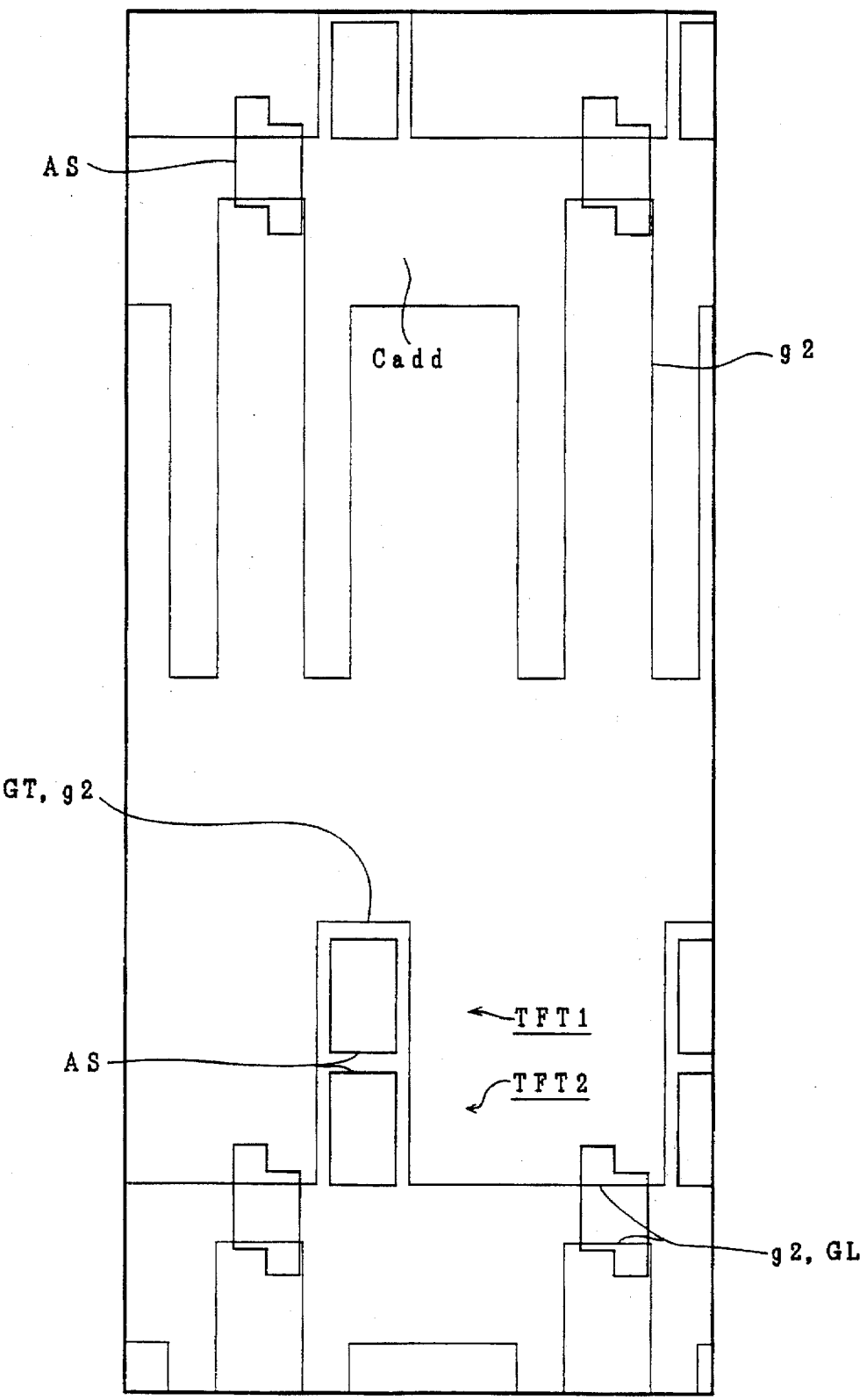
FIGS. 4 to 6 are top plan views showing certain-level layers of the pixels shown in FIG. 1.

The gate electrode GT is formed to project perpendicularly (i.e., upward, as viewed in FIGS. 1 and 4) from the scanning signal lines GL (or branched in the "T-shape"), as shown in detail in FIG. 4 (presenting a top plan view showing the layer g2 and AS of FIG. 1 only). The gate electrode GT is extended to the regions to be individually formed with the thin film transistors TFT1 and TFT2. These thin film transistors TFT1 and TFT2 have their individual gate electrodes GT integrated (as their common gate electrode) to merge into the scanning signal line GL. The gate electrode GT is constituted by single level conductive layer g2. The conductive layer g2 is formed by, for example, by sputtering aluminum in the thickness of about 1,000 to 5,500 angstroms. On the gate electrode GT an anodized oxide film of aluminum AOF is provided.

This gate electrode GT is made so slightly large as to cover the semiconductor layer AS completely (as viewed upward), as shown in FIGS. 1 and 2A and FIG. 4. In case, therefore, a back light BL such as a fluorescent lamp is attached to the bottom of the substrate SUB1, this opaque aluminum gate electrode GT establishes a shadow to shield the semiconductor layer AS from the back light, thus substantially eliminating the conducting phenomenon due to the optical irradiation, i.e., the deterioration of the OF characteristics of the TFTs. Here, the intrinsic size of the gate electrode GT is given the least necessary width (including the positioning allowance of the gate electrode of the source/drain electrodes) for extending between the source/drain electrodes SD1 and SD2. The depth for determining that channel width W is determined in dependence upon the factor W/L determining the mutual conductance gm, i.e., the ratio to the distance (i.e., the channel length) L between the source/drain electrodes.

The size of the gate electrode in the present embodiment is naturally made larger than the aforementioned intrinsic size.

Scanning Signal Line GL

The aforementioned scanning signal line GL is constituted by the second-level conductive film g2. The second-level conductive film g2 of the scanning signal line GL is formed at the same step and integrally with the second-level conductive film g2 of the aforementioned gate electrode GT.

Anodized oxide film AOF

An anodized oxide film ($Al_2O_3$) AOF is formed by anodizing the second conductive film g2. This anodized oxide film AOF is formed at a crossover portion of the scanning signal line GL with the video signal line DL, at the gate electrode portion GT and at the electrode portion PL1. Therefore, no short circuit occurs between the electrodes at the thin film transistor portion TFT or between the signal lines at the wiring crossover portion. Moreover, since the anodized oxide film AOF is disposed only at part of the scanning signal line GL, the wiring resistance of the scanning signal line GL can be limited to a low level. Further more, the dielectric constant of $Al_2O_3$ is 9.2 and the dielectric constant of silicon nitride is 6.7. Since the dielectric constant of $Al_2O_3$ is by about 30% higher than that of silicon nitride, the mutual conductance of the thin film transistor TFT can be improved by about 1.5 times. Moreover, since the area of the additional capacitor Cadd can be reduced, an open ratio can be improved. Unlike the prior art structure in which two layers of insulating films GI1, GI2 consisting of the silicon nitride film are disposed, the present invention does not need additionally expensive CVD apparatuses and hence, the production cost does not become higher.

Gate Insulating Film GI

The insulating film GI is used as the individual gate insulating films of the thin film transistors TFT1 and TFT2. The insulating film GI is formed over the gate electrode GT and the scanning signal line GL and the transparent pixel electrode ITO1. The insulating film GI is formed of, for example, a silicon nitride film prepared by the plasma CVD.

Figure 10:
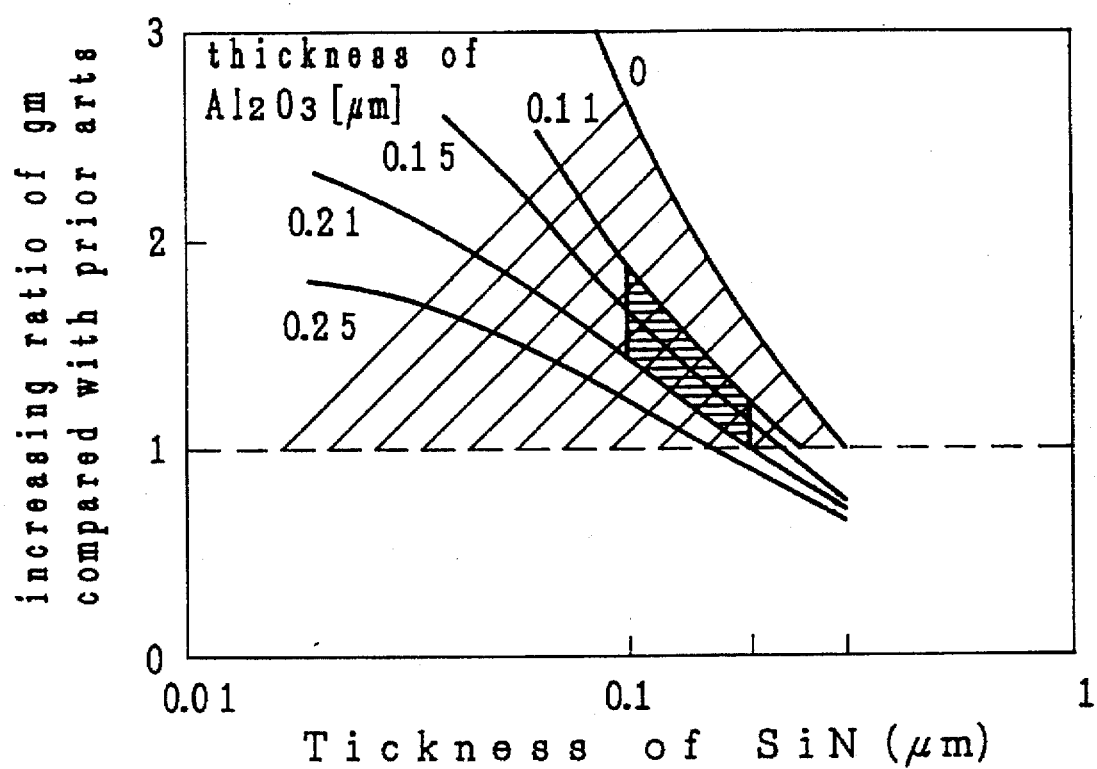
FIG. 10 is a diagram showing the relation between the film thickness of an insulating film and anodized oxide film and an increasing ratio of a mutual conductance gm.
Figure 11:
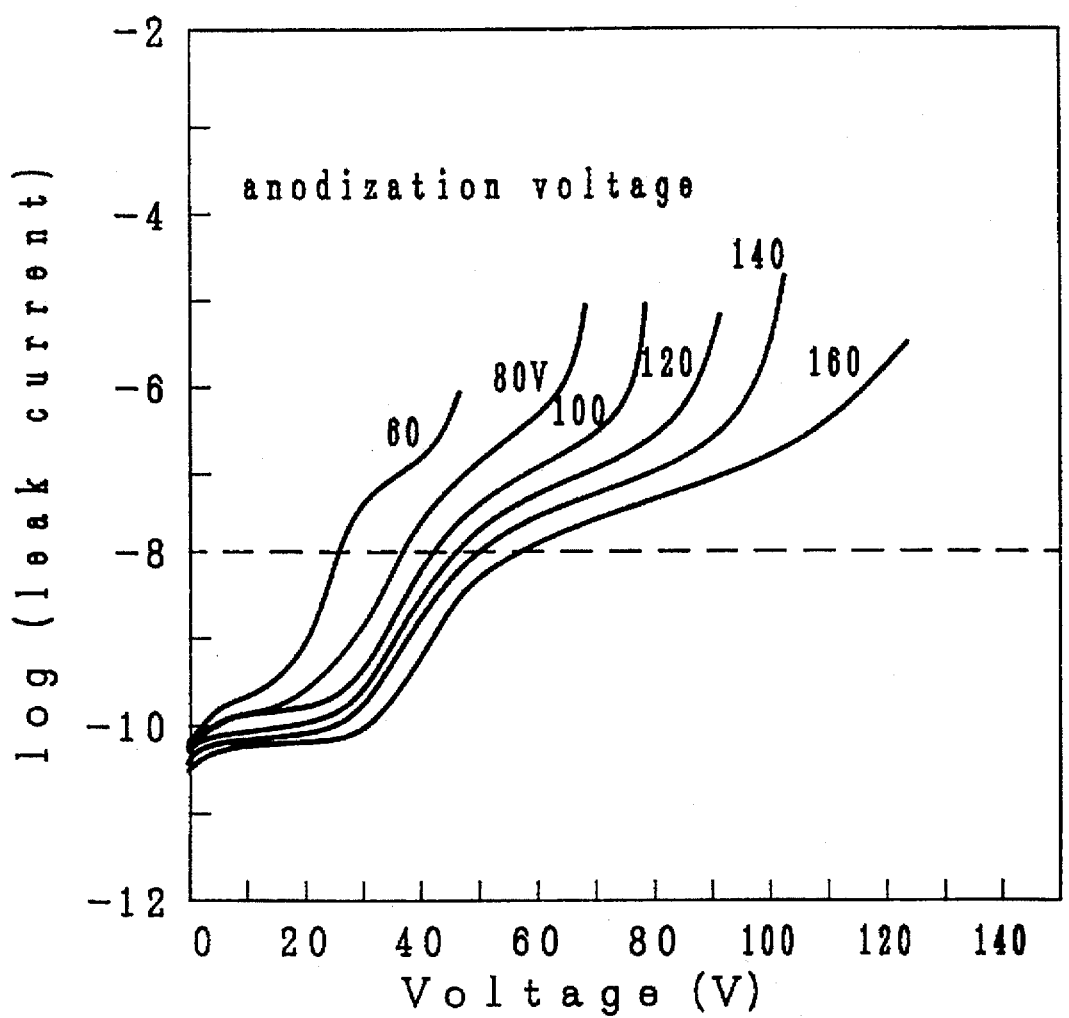
FIG. 11 is a diagram showing current characteristics of the anodized oxide film.

Next, the film thickness of the insulating film GI and that of the anodized oxide film AOF will be explained. FIG. 10 is a diagram showing the relation between the film thickness of the insulating film GI and that of the anodized film AOF with an increasing ratio of the mutual conductance gm when the gate insulating film is composed of the anodized oxide film AOF and the insulating film GI and when the mutual conductance gm of an ordinary insulating film GI (which is 0.3 Microm thick) is 1. If the film thickness of the insulating film Gi and the film thickness of the anodized oxide film AOF are determined so that the relation falls within the range represented by oblique lines in the diagram, the mutual conductance gm can be improved. Under a practical operation condition, on the other hand, a maximum 25 V voltage is applied between the gate electrode GT and the source electrode SD1 and between the gate electrode GT and the drain electrode SD2, and screening of 75 V, which is thrice this voltage, is effected. Since it is necessary to consider that there exist the portions which do not have the insulating film GI and the portions which do not have the anodized oxide film AOF, the film thickness of each of the insulating film GI and the anodized oxide film must be sufficient to withstand the 75 V voltage. The film thickness of the insulating film GI capable of withstanding the 75 V voltage is 1,200 [Angstrom] and the film thickness of the anodized oxide film AOF capable of withstanding this 75 V voltage is 1,100 [Angstrom], and this corresponds to the anodizing voltage of 80 V. FIG. 11 is a diagram showing the leakage current characteristics of the anodized oxide film AOF. Since the OFF current of the thin film transistor TFT is about $10^{-8}$ A/cm$^2$, the leakage current must be below $10^{-8}$ A/cm$^2$. It is when the anodizing voltage is 80 V or above that the leakage current is below $10^{-8}$ A/cm$^2$. From these aspects, too, the film thickness of the anodized oxide film AOF must be at least 1,100 [Angstrom]. On the other hand, when the anodizing voltage exceeds the withstand voltage of the resist at the time of anodization, the resist undergoes breakdown and the second conductive film g2 below the resist disappears. Therefore, it is not appropriate to raise the anodizing voltage, and it is preferred to set the anodizing voltage to 150 V or below (at which the film thickness of the anodized oxide film AOF is about 2,100 [Angstrom]). It is preferred from the explanation given above that the film thickness of the gate insulating film GI be from 1,200 to 2,200 and the film thickness of the anodized oxide film AOF be from [A] 1,100 to 2,100 [Angstrom], or in other words, both of their file thickness be the values within the range of the grid mesh shown in FIG. 10.

i-Type Semiconductor Layer AS

The i-type semiconductor layer AS is used as the individual channel forming regions of the thin film transistors TFT1 and TFT2 divided into a plurality of parts, as shown in FIG. 4. The i-type semiconductor layer AS is formed of an amorphous silicon film or polycrystalline silicon film to have a thickness of about 1,800 angstroms.

This i-type semiconductor layer AS is formed subsequent to the formation of the Si$_3$N$_4$ gate insulating film GI by changing the components of supply gases but by using the common plasma CVD system such that it is not exposed from the system to the outside. On the other hand, an N$^+$-type layer d0 (shown in FIG. 2A) doped with P for the ohmic contact is likewise formed subsequently to have a thickness of about 200 TO 500 angstroms. After this, the lower substrate SUB1 is taken out of the CVD system, and the N$^+$-type layer d0 and the i-type AS are patterned into independent islands by the photographic technology, as shown in FIGS. 1 and 2A.

The i-type semiconductor layer AS is also formed between the intersecting portions (or crossover portions) of the scanning signal line GL and the video signal line DL, as shown in detail in FIG. 1 and FIG. 4. This cross over i-type semiconductor layer AS is formed to reduce the short-circuiting between the scanning signal line GL and the video signal line DL at the intersecting portion.

Source/Drain Electrodes SD1 and SD2

Figure 5:
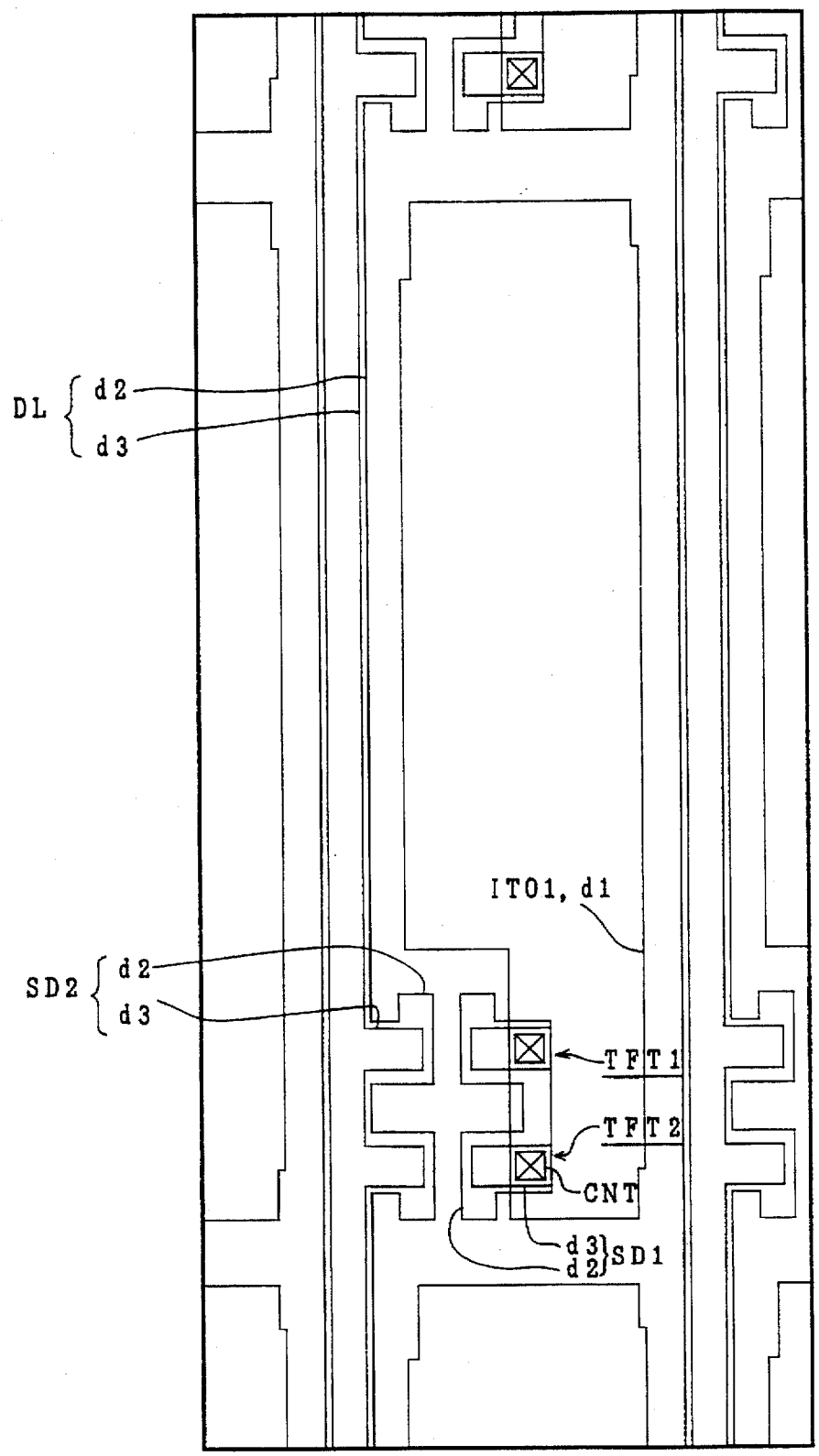

The individual source electrodes SD1 and drain electrodes SD2 of the divided thin film transistors TFT1 and TFT2 are formed over the semiconductor layer AS and separately from each other, as shown in detail in FIGS. 1 and 2A and in FIG. 5 (presenting a top plan view showing the layers d1 to d3 of FIG. 1 only).

Each of the source electrode SD1 and the drain electrode SD2 is formed by overlaying a second conductive film d2 and a third conductive film d3 sequentially from the lower side contacting with the N$^+$-type semiconductor layer d0. These second conductive film d2 and third conductive film d3 of the source electrode SD1 are formed at the same fabrication step as those of the drain electrode SD2.

The second conductive film d2 is formed of a sputtered chromium film to have a thickness of 500 to 1,000 angstroms [e.g., about 600 angstroms in the present embodiment]. The chromium film is formed to have a thickness no more than 2,000 angstroms because it establishes a high stress if it is made excessively thick. The chromium film has an excellent contact with the N$^+$-type semiconductor layer d0. The chromium film constitutes so called barrier layer preventing aluminum of the third conducting film d3 described hereinafter from diffusing into the N$^+$ type semiconductor layer d0. The second conductive film d2 may be made of not only the aforementioned chromium film but also a refractory metal (e.g., Mo, Ti, Ta or W) film or its silicide (e.g., MoSi$_2$, TiSi$_2$, TaSi$_2$ or WSi$_2$).

After the second conductive film d2 has been patterned with the photography, the N$^+$-type layer d0 is removed by using the same photographic mask or the second conductive film d2. Specifically, the N$^+$-type layer d0 left on the i-th layer AS removed in self-alignment while leaving the second conductive film d2 as it is. Since, at this time, the N$^+$-type layer d0 is etched to remove its whole thickness, the i-th layer AS is slightly etched off at its surface portion, but this removal may be controlled by the etching period.

After this, the third conductive film d3 is formed by sputtering or resistive-heating-evaporation aluminum to have a thickness of 3,000 to 8,000 angstroms [e.g., about 3,500 angstroms in the present embodiment]. The aluminum layer is less stressed than the chromium layer so that it can be formed to have larger thickness thereby to reduce the resistances of the source electrode SD1, the drain electrode SD2 and the video signal line DL.

Each of the second conductive film d2 of the sources electrode SD1 and the second conductive film d2 of the drain electrode SD2 is internally (i.e., into the channel region) turned more deeply than the upper lying third conductive film d3. In other words, the second conductive films d2 in those portions is enabled to regulate (define) the channel length L of the thin film transistor TFT independently of the layer d3.

The source electrode SD1 is connected with the transparent pixel electrode ITO1, as has been described hereinbefore. The source electrode SD1 is formed along the stepped shape (i.e., the step corresponding to the sum of the thicknesses of the second conductive film d2, the N$^+$-type layer d0 and the i-type semiconductor layer AS) of the i-type semiconductor layer AS.

More specifically, the source electrode SD1 is composed of the second conductive film d2 formed along the stepped shape of the i-type semiconductor layer AS and the third conductive film d3 formed over the second conductive film d2.

This third conductive film d3 of the source electrode SD1 is formed to ride over the i-type semiconductor layer AS because the chromium film of the second conductive film d2 cannot made so thick because of the increase in the stress as to ride over the stepped shape of the i-type semiconductor layer AS. In short, the second conductive film d2 is made thick to improve the step coverage. The third conductive film d3 can be made thick so that it can highly contribute to the reduction of the resistance of the source electrode SD1 (as well as those of the drain electrode SD2 and the video signal line DL).

Transparent pixel electrodes ITO1

The transparent pixel electrode ITO1 constitutes one of the parts of a pixel electrode of a liquid crystal display portion. The transparent pixel electrode ITO1 is connected with the source electrode SD1 through a through hole cnt forned in the insulating film GI.

The transparent pixel electrode ITO1 is constituted by the first conductive film d1. The transparent pixel electrode ITO1 is comprised of a transparent conductive film (Indium-Tin-Oxide, ITO, NESA film) formed by sputtering to have a thickness of about 1,000 to 2,000 angstroms (in this embodiment about 1,200 angstroms).

The transparent pixel electrode ITO1 is connected to the source electrode SD1 of the thin film transistor TFT1 and to the source electrode SD1 of the thin film transistor TFT2. If any defect occurs in one transistor TFT1, for example, the thin film transistor TFT1 is disconnected from the video signal line DL and the pixel electrode ITO1 by a laser beam, etc, during the manufacturing process. Accordingly, neither dot defect nor line defect occur and moreover, since the defect hardly occurs simultaneously in both of the two thin film transistors TFT1 and TFT2, the probability of the occurrence of the dot defect can be extremely reduced.

Moreover, since the transparent pixel electrode ITO1 is insulated from the gate electrode GT by the anodized oxide film AOF and also insulated from the video signal line D1 by the insulating film GI, the dot defects can be extremely reduced to obtain excellent display quality.

Furthermore, since the transparent pixel electrode ITO1 is formed in the same plane as the gate electrode GT, the number of insulating films can be reduced to make the manufacturing cost lower.

Passivation Film PSV1

Over the thin film transistor TFT and the transparent pixel electrode ITO1, there is formed the passivation film PSV1, which is provided mainly for protecting the thin film transistor TFT against humidity or the like. Thus, the passivation film PSV1 to be used is highly transparent and humidity resistant. The passivation film PSV1 is formed of a silicon oxide film or silicon nitride film prepared by the plasma CVD, to have a thickness of about 1 micron.

Gate terminal GTM

The gate terminal GTM is constituted by the first conductive layer g1 and the first conductive layer d1 as shown in FIG. 2D.

The first-level conductive layer g1 is formed by, for example, sputtering chromium (Cr) in the thickness of about 1,000 angstroms.

Shielding Film BM

Figure 6:
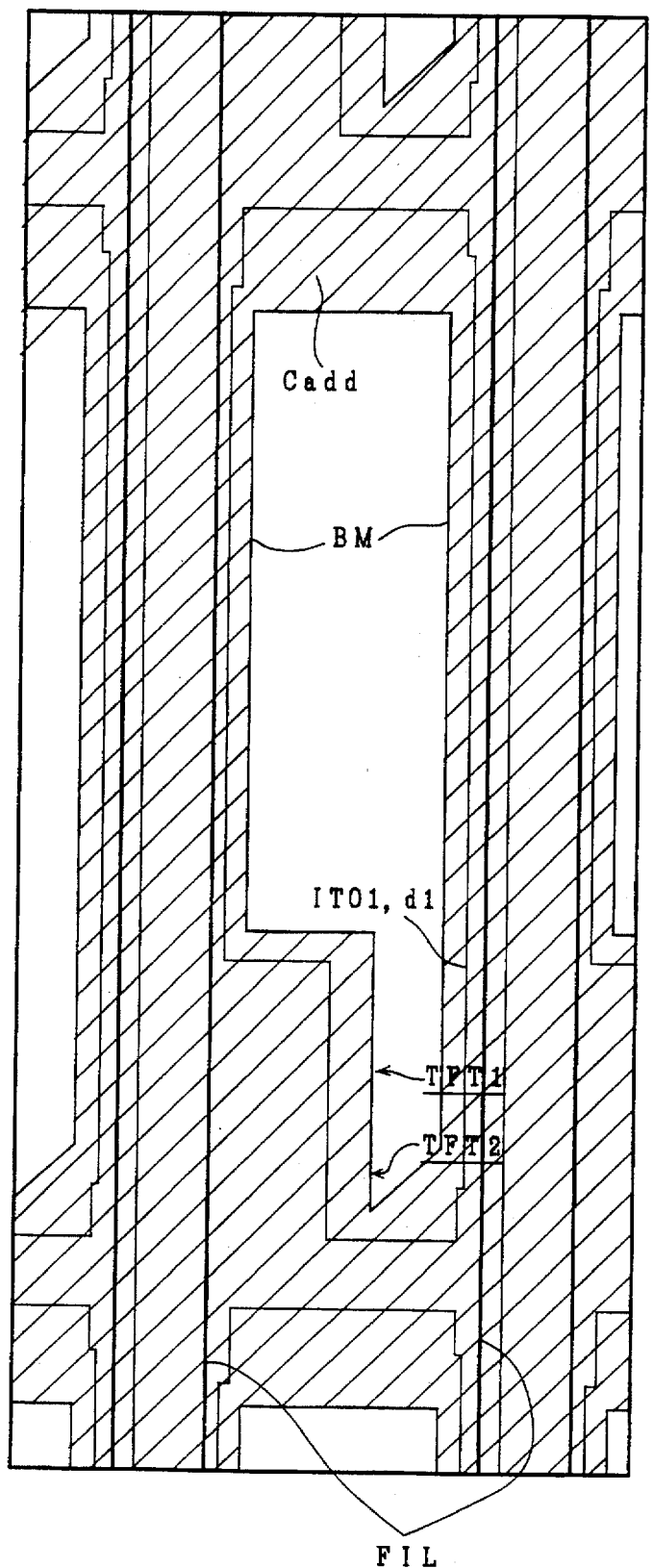

At the side of the upper substrate SUB2, there is disposed the shielding film BM for shielding any external light (i.e., the light coming from the top of FIG. 2A) from entering the i-type semiconductor layer As to be used as the channel forming region, as hatched to have the pattern shown in FIG. 6. Here, FIG. 6 is a top plan view showing only the first conductive layer d1 comprised of the ITO film, the filter layer FIL and the shielding film BM of FIG. 1. The shielding film BM is formed of a film having a high shielding property to the light, e.g., an aluminum film or chromium film. In the present embodiment, the shielding film BM is formed of a chromium film by the sputtering, to have a thickness of about 1,300 angstroms.

As a result, the common semiconductor layer AS shared by the TFT1 and TFT2 is sandwiched between the upper shielding film BM and the lower but larger gate electrode GT so that it is shielded from the outside natural light or the back light. The shielding film BM is formed around the pixel, as hatched in FIG. 6. Specifically, the shielding film BM is formed in a lattice (of black matrix) shape, which defines the effective display region of one pixel. As a result, the contour of each pixel is clarified to improve the contrast by the shielding film BM. In other words, this shielding film BM has two functions, i.e., the shielding for the semiconductor layer AS and black matrix functions.

Further, since the portion of the transparent pixel electrode ITO1 (at the lower right hand portion in FIG. 1) opposite to the foot of the rubbing direction is shielded from light by the shielding film BM, even if domain is induced at the above portion, the display characteristics is hardly deteriorated because the domain is shaded.

Incidentally, the back light may be attached to the side of SUB2, whereas the SUB1 may be disposed at the observation side (exposed to the outside).

Common Electrode ITO2

The common transparent pixel electrode ITO2 is opposed to the transparent pixel electrode ITO1, which is provided for each pixel at the side of the lower transparent glass substrate SUB1, so that the liquid crystal has its optical state varied in response to the potential difference (or electric field) between each pixel electrode ITO1 and the common pixel electrode ITO2. This common transparent pixel electrode ITO2 is fed with the common voltage Vcom. This common voltage Vcom is at an intermediate potential between a driving voltage Vdmin at the low level and a driving voltage Vdmax at the high level, both of which are applied to the video signal line DL.

Color Filter FIL

Figure 7:
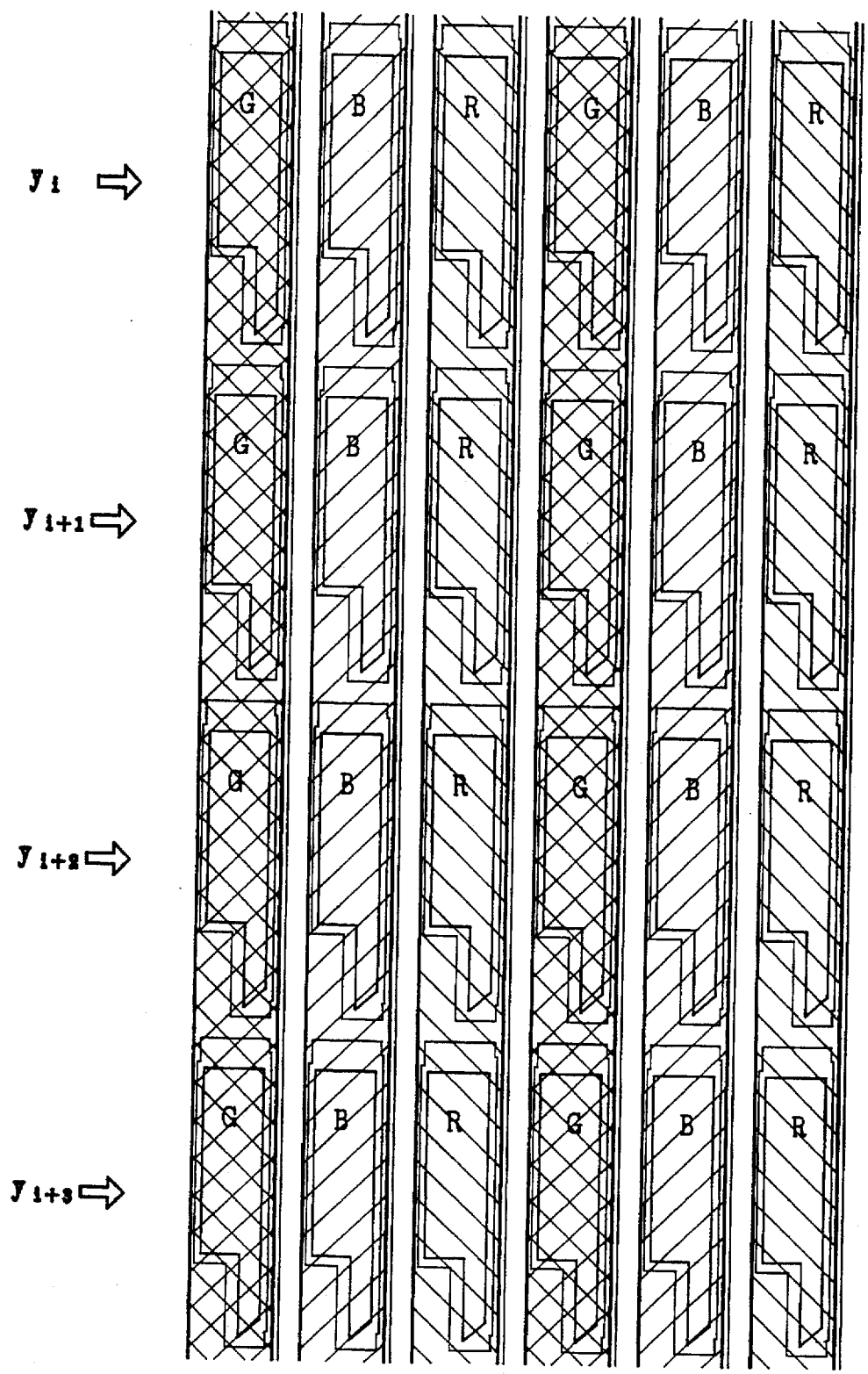
FIG. 7 is a top plan view showing an essential portion of only the pixel electrode layer, the light-shielding layer and the color filter layer shown in FIG. 3.

The color filter FIL is prepared by cooling a dyeing base, which is made of a resin material such as an acrylic resin, with a dye. The color filter FIL is formed (as shown in FIG. 7) in the shape of stripe and in a position to face the pixel. (FIG. 7 shows the first conductive film d1, the black matrix layer BM and the color filter layer FIL of FIG. 3 only, and the B, G and R filters are hatched at 45 degrees and 135 degrees and in a cloth, respectively.)

The color filter FIL is made slightly large to cover the pixel electrode ITO1 in its entirety, as shown in FIG. 6. The shielding film BM is so formed inside of the peripheral edge of the pixel electrode ITO1 as to overlap the color filter FIL and the pixel electrode ITO1.

The color filter FIL can be formed in the following manner. First of all, the dyeing base in formed on the surface of the upper transparent glass substrate SUB2, and the dyeing base other than that in the red color filter forming region is removed by the photolithographic technology. After this, the dyeing base is dyed with the red dye and fixed to form the red filter R. Next, the green filter G and blue filter B are sequentially formed by the similar steps.

Passivation Film PSV2

The passivation film PSV2 is provided for preventing the dyes for the different colors of the aforementioned color filter FIL from leaking into the liquid crystal LC. The passivation film PSV2 is made of a transparent resin material such as an acrylic resin or epoxy resin.

Equivalent Circuit of Whole Display Circuit

Figure 8:
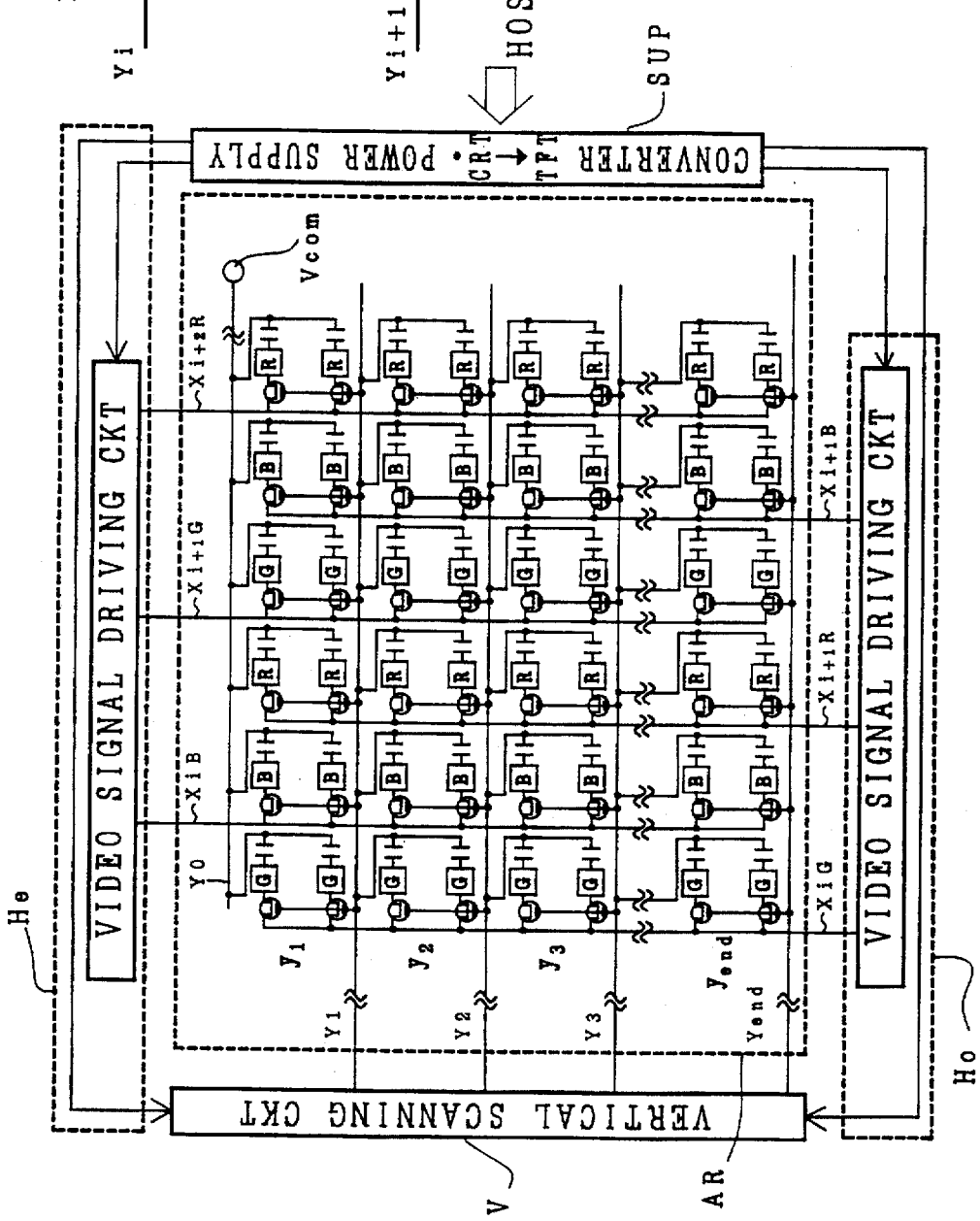
FIG. 8 is an equivalent circuit diagram showing a display unit of the active matrix color liquid crystal display device.

FIG. 8 shows an equivalent circuit diagram of the display matrix portion and a wiring diagram of its peripheral circuits. Though this drawing is a circuit diagram, it is depicted in such a manner as to correspond to a practical geometric disposition. Symbol AR represents a matrix array formed by disposing two-dimensionally a plurality of pixels.

In the drawing, symbol X represents the video signal line, and suffixes G, G and R are corresponding to green, blue and red pixels, respectively. Symbol Y represents the scanning signal line GL and suffixes 1, 2, 3, . . . , end are put in accordance with the sequence of scanning timing.

The video signal line X (whose suffix is omitted) is alternately connected to the upper (or odd-numbered) video signal driving circuit He and to the lower (or even-numbered) video signal driving circuit Ho.

Symbol SUP represents a circuit which includes a power supply circuit for obtaining a plurality of divided and stabilized voltage sources from one voltage source and a circuit for converting data for CRT (cathode-ray tube) from a host (higher order operational processor) to data for the TFT liquid crystal display device.

Structure of Additional Capacitor Cadd

The transparent pixel electrodes ITO1 is formed to overlap the adjoining scanning signal line GL at the end opposite to the end to be connected with the thin film transistor TFT. This superposition constitutes a latching capacity element (or electrostatic capacity element) Cadd which uses the transparent pixel electrode ITO1 as its one electrode PL1 and the adjoining scanning signal line GL as its other electrode PL2, as is apparent from FIG. 2B. This latching capacity element Cadd has its dielectric films formed of the anodized oxide film AOF.

The latching capacitor Cadd is formed in the widened portion of the second-level conductive layer g2 of the gate line GL, as is apparent from FIG. 4. Here, the layer g2 at the portion intersecting the drain line DL is thinned to reduce the probability of the short-circuiting with the drain line.

Equivalent Circuit of Additional Capacitor Cadd and its Operations

Figure 9:
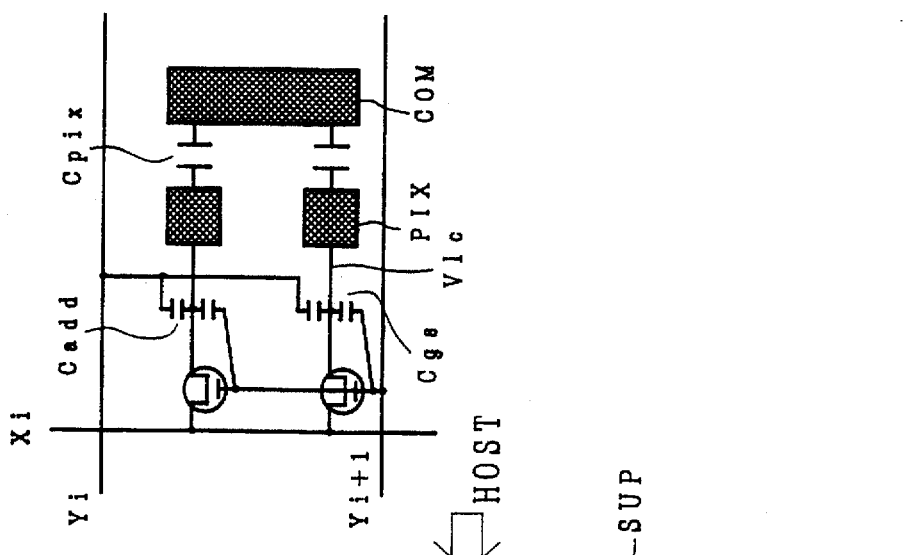
FIG. 9 is an equivalent circuit diagram of the pixels shown in FIG. 1.

The equivalent circuit of the pixel shown in FIG. 1 is shown in FIG. 9. In FIG. 9, letters Cgs designate a parasitic capacitor to be formed between the gate electrode GT and the source electrode SD1 of the thin film transistor TFT. The parasitic capacitor Cgs has its dielectric film made of the anodized oxide film AOF and the insulating film GI. Letters Cpix designate a liquid crystal capacitor to be formed between the transparent pixel electrode ITO1 (or PIX) and the common transparent pixel electrode ITO2 (or COM). The dielectric film of the liquid capacitor Cpix is formed of the liquid crystal LC, the insulating film GI, the passivation film PSV1 and the alignment films ORI1 and ORI2. Letters Vlc designate a mid point potential.

The aforementioned latching capacity element Cadd functions to reduce the influences of the gate potential variation "delta" Vg upon the center potential (e.g., the pixel electrode potential) Vlc when the TFT switches, as expressed by the following formula:

$$\text{"delta" } Vlc = \{Cgs/(Cgs+Cadd+Cpix)\} \times \text{"delta" } Vg,$$

wherein "delta" Vlc designates the variation of the central potential due to "delta" Vg.

This variation "delta" Vlc causes the DC component to be added to the liquid crystal and can be reduced the more for the higher latching capacitor Cadd.

Moreover, the latching capacitor Cadd functions to elongate the discharge time and stores the video information for a long time after the TFT is turned off. The DC component to be applied to the liquid crystal LC can improve the lifetime of the liquid crystal LC, if reduced, to reduce the so-called "printing", by which the preceding image is left at the time of switching the liquid crystal display frame.

Since the gate electrode GT is enlarged to such an extent as to cover the semiconductor layer AS completely, as has been described hereinbefore, the overlapped area with the source/drain electrodes SD1 and SD2 is increased to cause an adverse effect that the parasitic capacity Cgs is increased to make the centex potential Vlc liable to be influenced by the gate ((scanning) signal Vg. However, this demerit can be eliminated by providing the latching capacitor Cadd.

The latching capacity of the aforementioned latching capacity element Cadd is set from the pixel writing characteristics to a level four to eight times as large as that of the liquid crystal capacity Cpix (4Cpix<Cadd<8Cpix) and eight to thirty two times as large as that of the capacity Cgs (8Cgs<Cadd<32Cgs).

Method of Connecting Electrode Line of Additional Capacitor Cadd

The initial stage scanning signal line GL (i.e., Yo) to be used only as the capacity electrode line is connected with the common transparent pixel electrode (Vcom) ITO2, as shown in FIG. 8. The common transparent pixel electrode IT02 is connected with a leading-out line in the peripheral edge of the liquid crystal display circuit by means of a silver paste SL, as shown in FIG. 2A. Moreover, this leading-out line has its partial conductive layer (g1 or g2) prepared at the same step as that of the gate external terminals GTM and the scanning signal line GL. As a result, the final stage capacity electrode line GL can be easily connected with the common transparent pixel electrode ITO2.

The first stage capacitor electrode line Yo may be connected either the final stage scanning line $Y_{end}$, a D.C. voltage potential (A.C. common potential) other than $V_{com}$ or the vertical scanning circuit V to receive an additional or redundant scanning pulse Yo.

Manufacturing Method

Next, the method for manufacturing the liquid crystal display device as shown in FIG. 1 etc. will be explained. To begin with, a silicon dioxide film SIO is deposited by dip treatment on both surfaces of a lower transparent glass substrate SUB1 made of 7059 glass (trade name) and then baking is carried out at 500° C. for 60 minutes.

Figure 12:
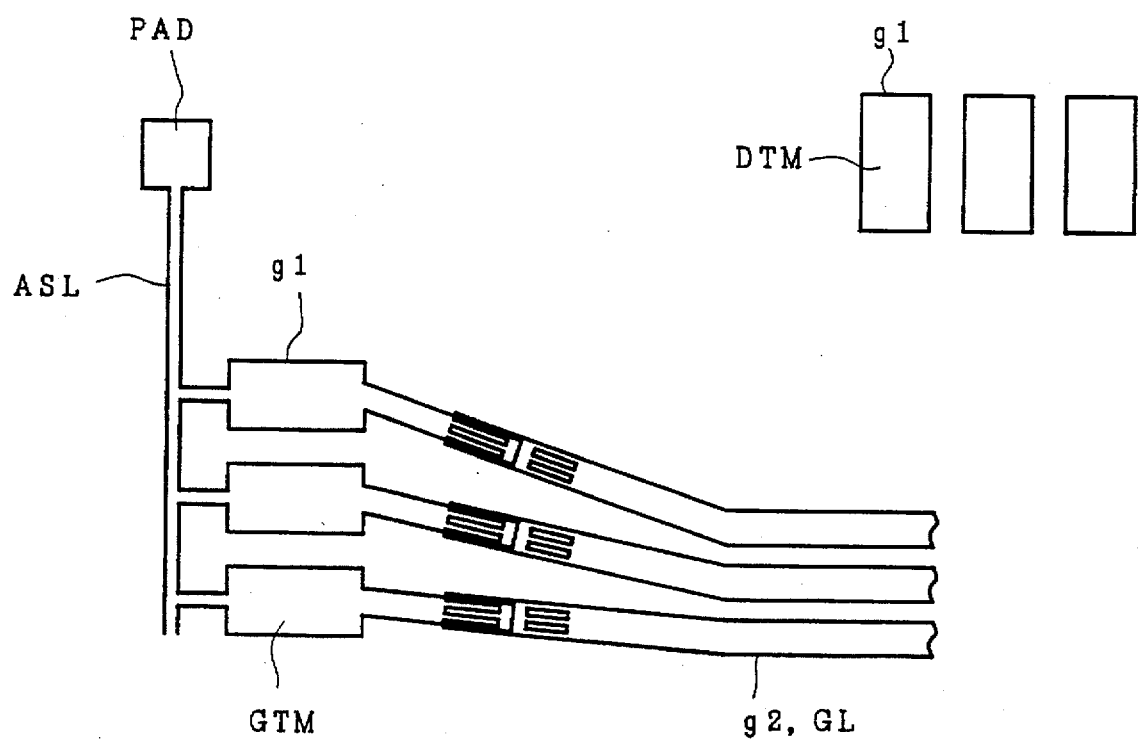
FIG. 12 is an explanatory view of a production method of the liquid crystal display device shown in FIG. 1.

Next, a first conductive film g1 consisting of a 1,100 angstrom-thick chrominum film is deposited on the lower transparent glass substrate SUB1 by sputtering. The first conductive film g1 is then etched selectively by photoetching using aceric amonium nitrate solution as an etching solution, thereby forming a gate terminal GTM and a drain terminal DTM and forming also a power supply line ASL for anodization for connecting the gate terminal GTM and a pad PAD connected to the power supply line ASL for anodization, as shown in FIG. 12.

After the resist is removed by a peeling solution S502 (trade name), $O_2$ asher is carried out for one minute. Next, a second conductive film g2 consisting of a 2,600 angstrom-thick film of aluminum is disposed by sputtering.

The second conductive film g2 is etched selectively by photoetching using a mixed acid solution of phosphoric acid, nitric acid and acetic acid as the etching solution, forming thereby the scanning signal line GL, the gate electrode GT and the electrode PL1 of a retention capacitance device Cadd. In this case, the overlapping portion between the second conductive film g2 with the first conductive film g1 is formed in a comb shape and the portion near the overlapping portion is shaped in a stripe form having a width of below 10 microns.

Next, an $SF_6$ gas is introduced into a dry etching apparatus and after a residue such as silicon is removed, the resit is removed.

Next, after a 3 Microm thick resist is coated, the resit at the crossover portion between the scanning signal line GL and the video signal line DL, at the gate electrode portion GT and at the electrode portion PL1 is removed by a photoetching process. Next, the anodized oxide film AOF is formed by immersing the assembly into an anodizing solution prepared by neutralizing a 3% tartaric acid solution with ammonia, diluting the solution ten-fold with ethylene glycol or propylene glycol and adjusting the pH of the solution to 7±0.5, and by applying an anodizing voltage to the pad PAD so as to anodize the second conducting film g2. In this case, the voltage is gradually raised from 0 to 120 V so that a current density is 0.5–10 mA/cm² at the beginning (constant current anodization), and after the voltage reaches +120 V, it is kept at that value. Then, the second conductive film g2 which is about 1,100 [Angstrom] thick is oxidized in the course of about 30 minutes and an about 1,700 [Angstrom] -thick anodized oxide film AOF can be obtained. After the resist is removed, heating is carried out at 200°–400° C. for 60 minutes at the atmospheric pressure or in vacuum. The first conductive film d1 which consists of a 1,000 [Angstrom] -thick ITO film is the disposed by sputtering. The first conductive film d1 is selectively etched by a photoetching process using a mixed solution of hydrochloric acid and nitric acid as an etching solution, forming thereby the transparent pixel electrode ITO1 and the uppermost layer of the gate terminal GTM and drain terminal DRM.

Next, ammonia gas, silane gas and nitrogen gas are introduced into a plasma CVD apparatus and a silicon nitride film GI having a film thickness of 200 to 1,000 angstroms is disposed. Silane gas and hydrogen gas are then introduced into the plasma CVD apparatus and an i-type amorphous silicon film AS having a film thickness of 2,100 angstroms is disposed. Thereafter, hydrogen gas and phosphine gas are introduced and an $N^+$-type silicon film d0 having a film thickness of 200 to 500 angstroms doped with phosphor of 0.6 to 2.5 [%] is disposed.

The $N^+$-type silicon film d0 and the i-type amorphous silicon film AS are selectively etched by photoetching using $SF_6$ and $CCl_4$ as a dry etching gas, thereby forming an i-type semiconductor layer AS.

After the resist is removed, the silicon nitride film d2 is selectively etched by photoetching using $SF_6$ as the dry etching gas to form an insulating film GI and provide the through-hole CNT for connecting the source electrode SD1 and the transparent pixel electrode ITO1.

After the resist is removed, the second conductive film d2 consisting of a chrominum film having a thickness of 500 to 1,000 angstroms is disposed by sputtering. Next, the second conductive film d2 is selectively etched by photoetching, forming thereby the video signal line DL, the source electrode SD1, the first layer of the drain electrode SD2 to also form the dielectric breakdown prevention line (not shown) for connecting the drain electrode DTM, and connected to the power supply line ASL for anodization shown in FIG. 12.

Before the resist is removed, $CCl_4$ and $SF_6$ are introduced into the dry etching apparatus and the $N^+$-type silicon film is selectively etched to form an $N^+$-type semiconductor layer d0. Then, after the resist is removed, $O_2$ asher is carried out for one minute.

Next, the third conductive film d3 consisting of a 3,000 to 8,000 angstrom-thick film of aluminum is disposed by sputtering or resistive-heating evaporation.

Then, the third conductive film d3 is selectively etched by photoetching, forming thereby the video signal line DL, the source electrode SD1 and the second layer of the drain electrode SD2. Next, after the resist is removed, $O_2$ asher is carried out for one minute.

After the resist is removed, ammonia gas, silane gas and nitrogen gas are introduced into the plasma CVD apparatus and a silicon nitride film having a film thickness of one micron is deposited. Next, the silicon nitride film is selectively etched by photoetching using $SF_6$ as the dry etching gas to form the protective film PSV1.

Figure 13:
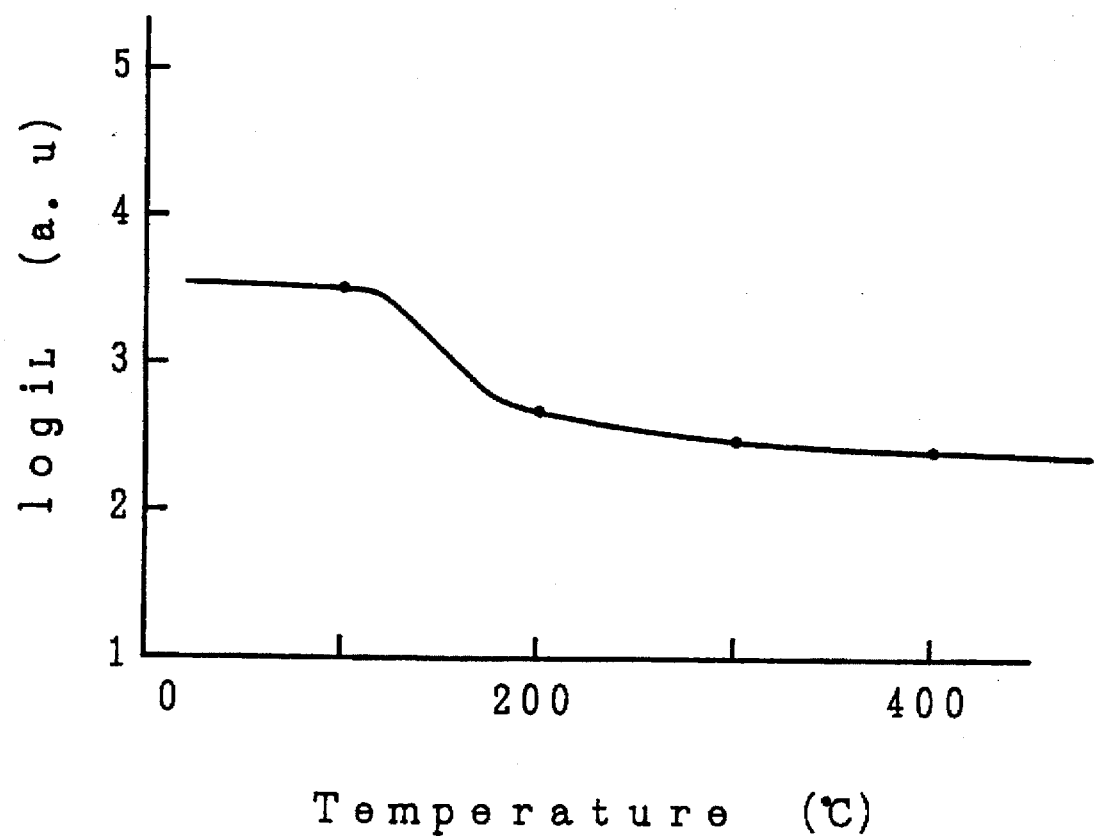
FIG. 13 is a diagram showing the relation between a heat-treating temperature and a leakage current.

In the production method of this liquid crystal device, the overlap portion between the second conductive film g2 and the: first conductive film g1 is shaped in the comb form and the portion near the overlap portion is shaped in the form of stripes having a line width of up to 10 [Microm]. Accordingly, the occurrence of whiskers can be prevented. It has been found by experiments carried out by the present inventors that the whisker density is $4.9 \times 10^{-6}$ pcs/cm² when the line width of the aluminum film is 70 [Microm], is $3.6 \times 10^{-6}$ pcs/cm² when the line width is 25 [Microm] and is 0 pc/cm² when the line width is 10 [Microm]. Since heat-treatment is carried out at 200°–400° C. for 60 minutes after the anodized oxide film AOF is disposed, the leakage current of the anodized oxide film AOF can be reduced by the order of one digit as is obvious from FIG. 13, too. The heat-treating temperature is preferably below 400° C. because the second conductive film g2 is likely to peel if the heat-treating temperature is higher than 400° C.

Figure 14:
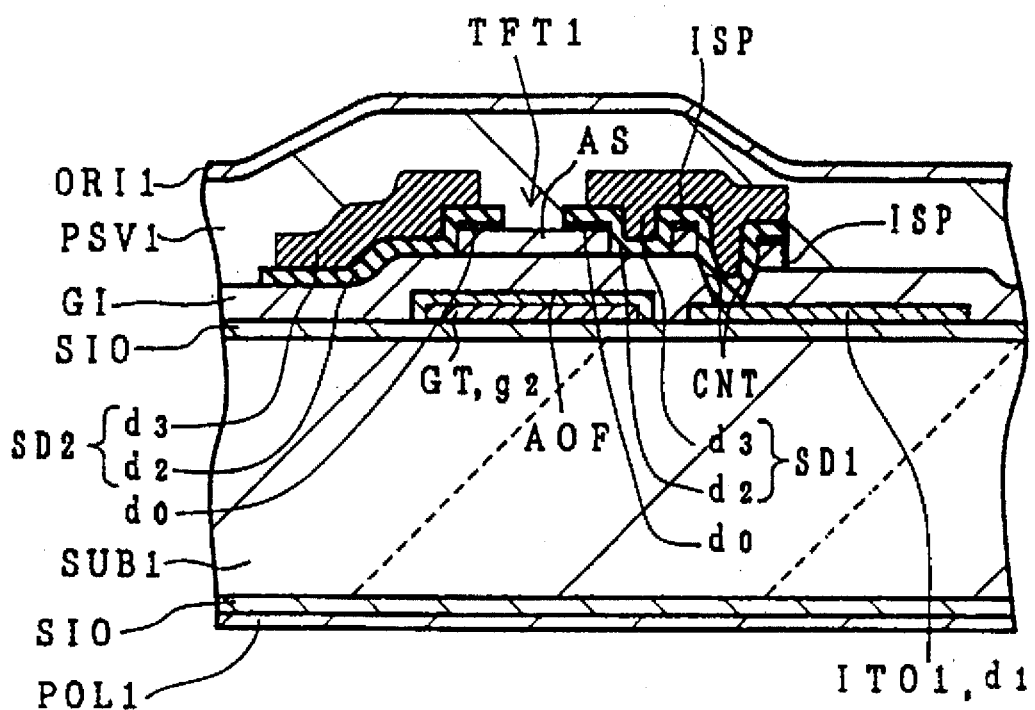
FIG. 14 is a sectional view showing part of a liquid crystal display portion of an active matrix type liquid crystal display device of another embodiment of the present invention.

FIG. 14 is a sectional view showing part of the liquid crystal display portion of the active matrix type color liquid, crystal device in another embodiment of the invention. In this liquid crystal display device, an isolated pattern ISP consisting of an i-type amorphous silicon layer (AS) and an $N^+$-type silicon layer (d0) is formed around the periphery of the through-hole CNT bored in the insulating film GI consisting of the silicon nitride film. Therefore, the edge surface of the through-hole becomes a slope surface, so that the transparent pixel electrode ITO1 and the source electrode SD1 can be reliably connected through this through-hole.

The liquid crystal display device shown in FIG. 14 can be produced in the following way. First of all, the transparent pixel electrode ITO1 is formed and then, the silicon nitride layer (GI) is disposed. After the i-type amorphous silicon layer (AS) is disposed, the $N^+$-type silicon (d0) is disposed. Next, the $N^+$-type silicon layer (d0) and the i-type amorphous silicon layer (AS) are selectively etched, forming thereby the i-type semiconductor layer AS. The isolated pattern ISP having a dimension somewhat greater than the through-hole CNT is then formed. Next, the silicon nitride layer (GI) is selectively etched to provide the insulating film GI, and the through-hole CNT is formed, whereby the edge surface of the through-hole CNT becomes the slope surface.

Figure 15:
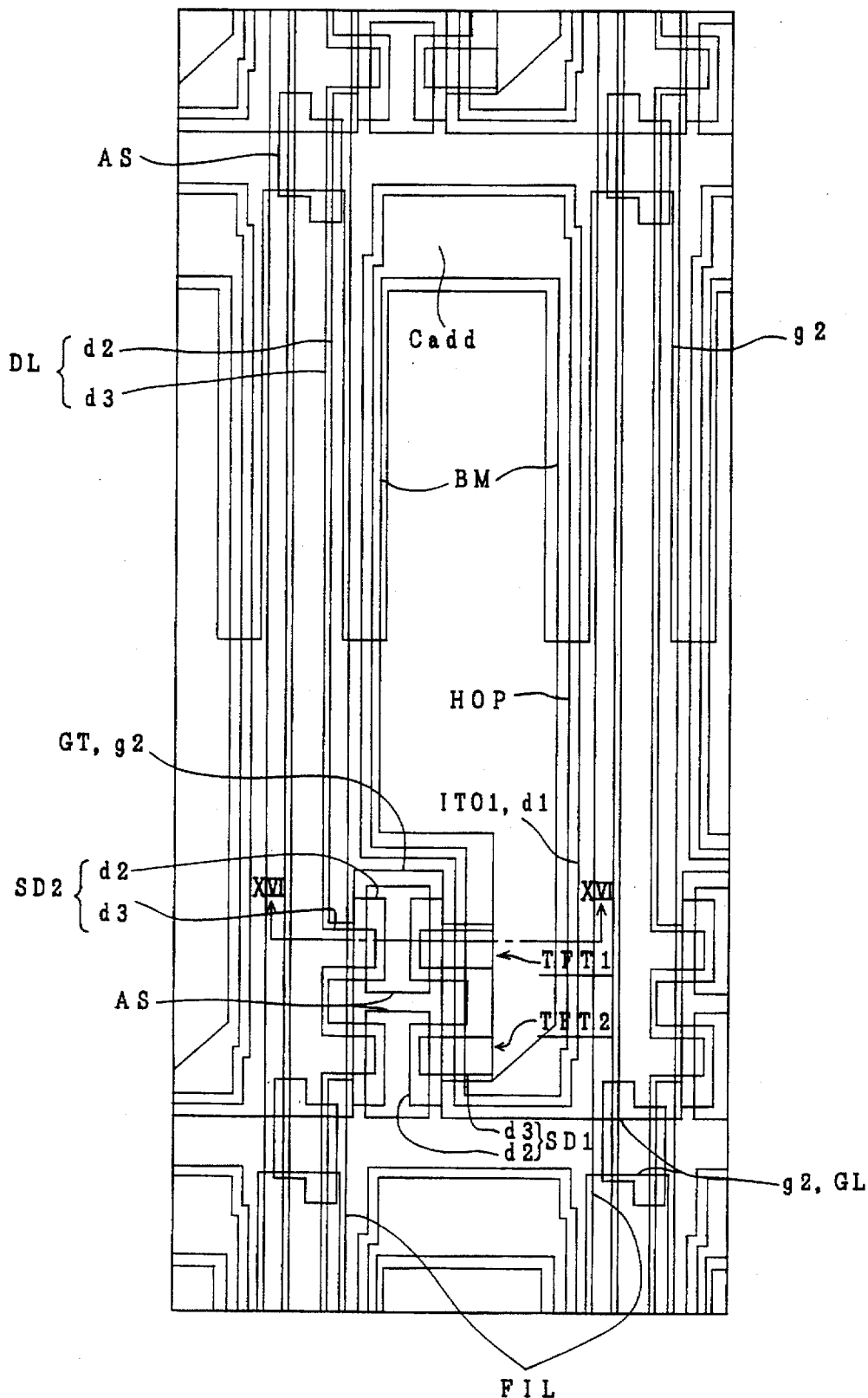
FIG. 15 is a plan view showing the principal portions of one pixel of a liquid crystal display portion of an active matrix type color liquid crystal display device of still another embodiment of the present invention.
Figure 16:
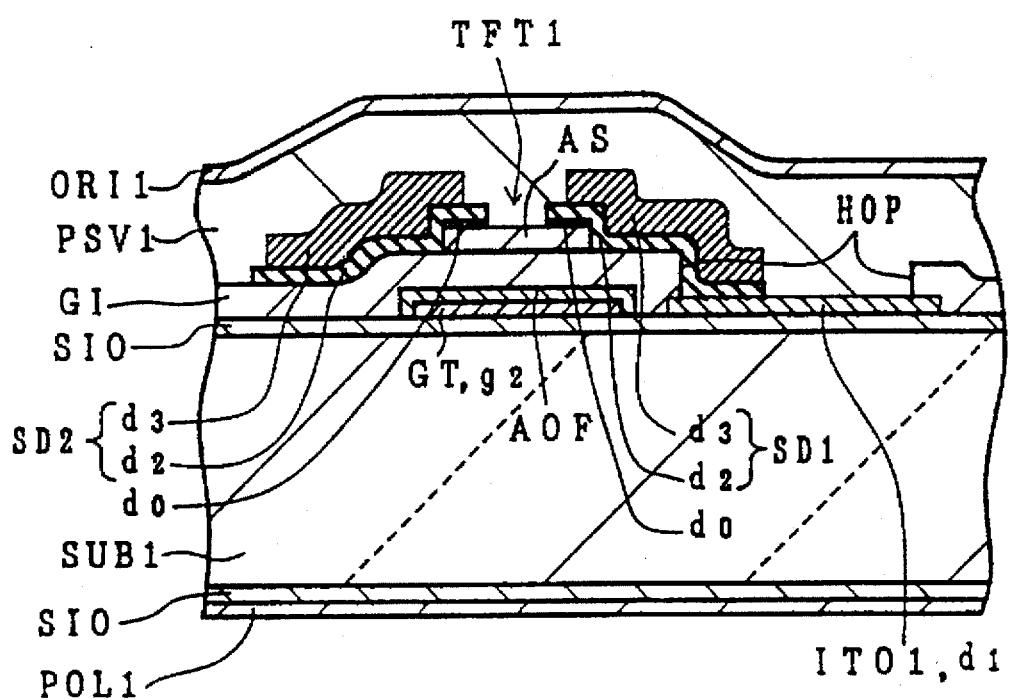
FIG. 16 is a sectional view taken along line XVI—XVI of FIG. 15.
Figure 17:
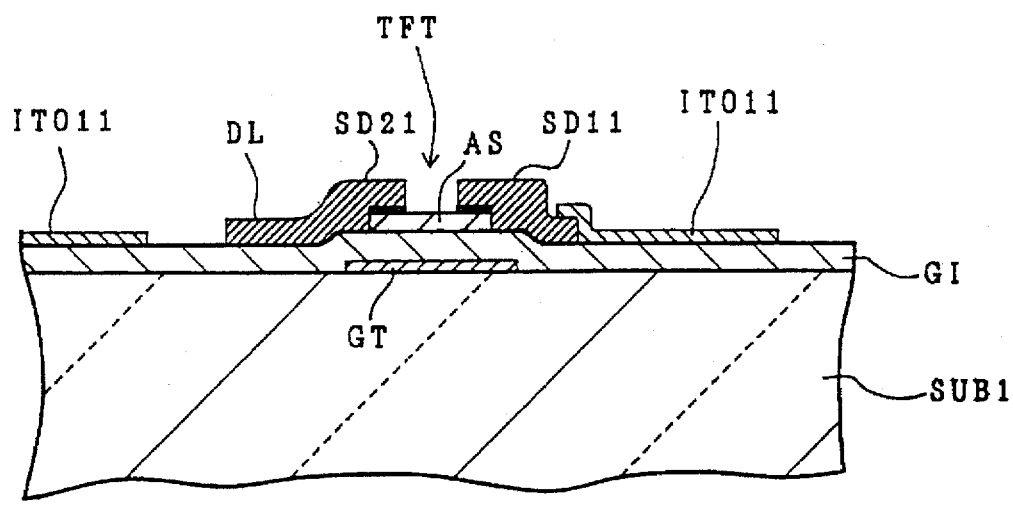
FIGS. 17 and 18 are sectional views, each showing part of a conventional liquid crystal display device.
Figure 18:
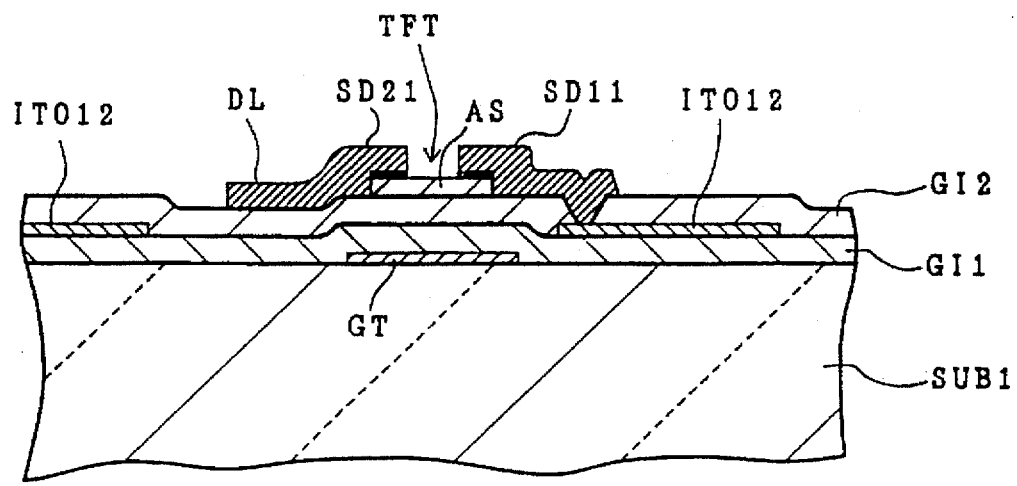

FIG. 15 is a plan view showing the principal portions of one pixel of the liquid crystal display portion of another active matrix type color liquid display device in the present invention, and FIG. 16 is a sectional view taken along line XVI—XVI of FIG. 15. In this liquid crystal display device, a hole portion HOP is disposed in the insulating film GI, and the transparent pixel electrode ITO1 and the source electrode SD1 are connected through the end portion of this hole portion HOP. Since the insulating film GI on the transparent pixel electrode ITO1 is substantially eliminated by disposing the hole portion HOP, the film thickness of the insulating film formed on the transparent pixel electrode ITO1 becomes smaller, so that the voltage acting on the liquid crystal LC can be made greater. Moreover, the insulating film GI is formed between the transparent pixel electrode ITO1 and the video signal line DL and hence, the transparent pixel electrode ITO1 and the video signal line DL do not short-circuit. Accordingly, dot defects do not occur and display performance is excellent.

(Modified Embodiment of Additional Capacitor Cadd

Figure 19A:
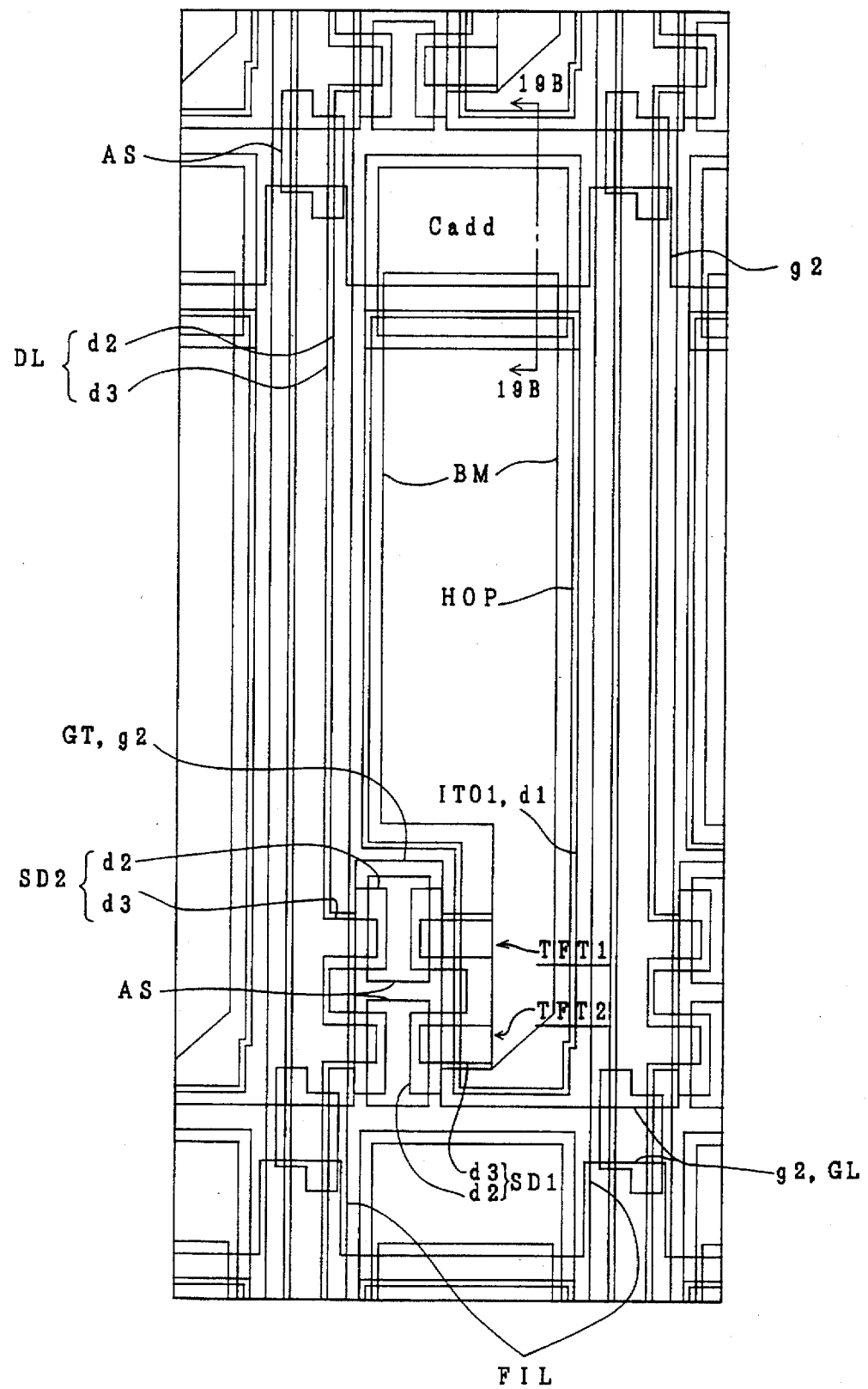
FIG. 19A is a plan view showing still another embodiment of the present invention.
Figure 19B:
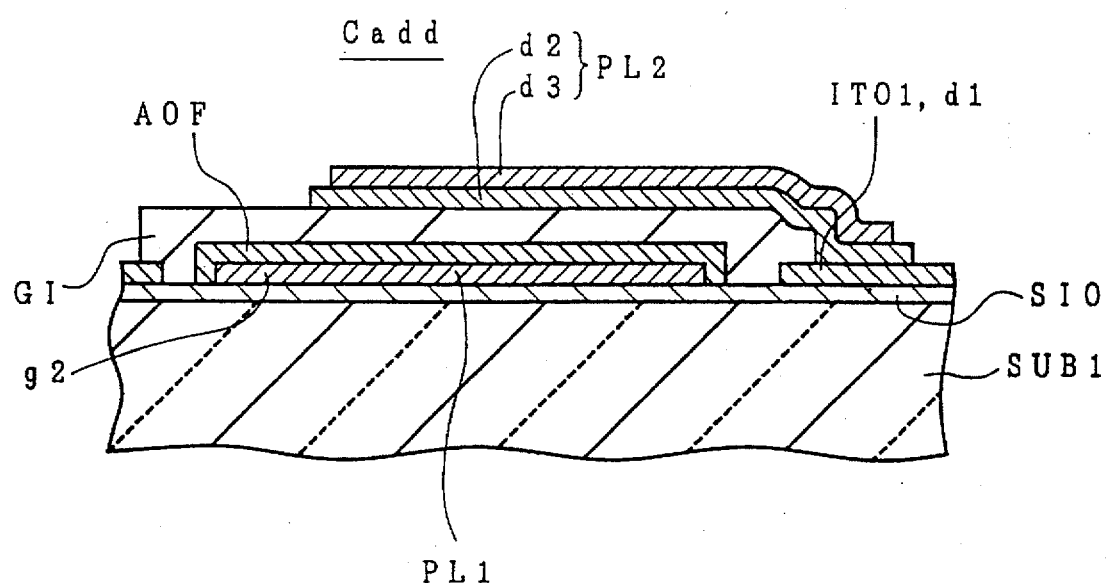
FIG. 19B is a sectional view of an additional capacitor Cadd along line 19B—19B of FIG. 19A.

FIG. 19A is a plan view showing another embodiment of the present invention and FIG. 19B is a sectional view of an additional capacitor Cadd taken along line 19B—19B of FIG. 19A.

A great difference of this embodiment from the embodiments shown in FIGS. 2B and 15 is that the upper electrode PL2 of the additional capacitor Cadd is formed by layers d2 and d3 having the same level as the source drain electrodes SD1, SD2 and its dielectric is composed of the anodized oxide film AOF and the SiN insulating film GI.

In the embodiments described already, the dielectric of the additional capacitor Cadd is a single layer of the anodized oxide film AOF and has a relatively simple structure. Therefore, it has a merit that utilization efficiency of the planar area is high. On the other hand, the analysis carried out by the present inventors reveals that insulation defects occur more greatly in comparison with the insulating films formed by a CVD (Chemical Vapor Deposition) process and a thermal oxidation process. In this respect, since this embodiment uses the insulating film GI having high film quality, which is formed by the CVD process, as the dielectric of the capacitor, the embodiment has the effects of reducing the leakage current between the opposed electrodes and preventing the short-circuit.

One of the electrodes of this additional capacitor Cadd (PL2 in this embodiment) must be connected to the source electrode SD1 or to the transparent pixel electrode ITO1 from the aspect of the circuit function. In this embodiment, since the pattern is formed so that the conductive layer d2 and the transparent electrode layer d1 overlap inside the hole portion HOP of the afore-mentioned insulating film GI, the transparent pixel electrode ITO1 and the upper capacitance electrode PL2 are brought into mutual contact without increasing the number of the production steps and masks for photo-processing.

Although the invention completed by the present inventors has thus been described definitely with the embodiments thereof given above, the present invention is not particularly limited thereto but can of course be changed or modified in various ways without departing from the spirit thereof.

For example, in the embodiments given above, the scanning signal line GL and the gate electrode GT are constituted by the second conductive film g2 made of aluminum, but it is also possible to dispose an anodized oxide film of tantalum, etc, at the gate electrode GT portion by using a metal such as tantalum (Ta). In the embodiments given above, the transparent pixel electrode ITO1 is constituted by the first conductive film d1 consisting of the ITO film, but the pixel electrode may be constituted by a metal film in the case of a reflection type. Furthermore, the embodiments given above use the aluminum film as the second conductive film g2, but an aluminum film containing 1% or less silicon or palladium (Pd) can also be used. Though the embodiments given above use the aluminum film as the third conductive film d3, an aluminum film containing silicon or palladium can also be used. Though the additional capacitor Cadd is formed between the adjacent scanning signal lines GL in the embodiments given above, the additional capacitor need not be disposed. The additional capacitor may be formed between the scanning signal lines of the same stage.

What is claimed is:

1. An active matrix display device, comprising:

at least one row and at least one column of picture cells provided over a transparent substrate, each picture cell being coupled to a scanning line and a video signal line, and each picture cell including a pixel electrode, a thin film transistor, having drain, source and gate electrodes, and a storage capacitor, said pixel electrode being electrically connected to one of the source and drain electrodes of said thin film transistor and to an electrode corresponding to said storage capacitor, wherein said thin film transistor is comprised of a gate electrode corresponding to a first conductive layer, a gate insulator provided on said gate electrode, a channel region provided above said gate electrode and including an amorphous silicon layer provided on said gate insulator, and the source and drain electrodes of said thin film transistor are provided at laterally opposing ends of said channel region, wherein said pixel electrode is comprised of a second conductive layer, wherein said storage capacitor is comprised of a first electrode, a second electrode and a dielectric insulator interposed between the first and second electrodes, and wherein the gate insulator of said thin film transistor is formed of a composite insulator layer including a gate surface oxide film, formed by oxidation of said gate electrode, and a silicon nitride film thereon, said gate surface oxide film being formed to cover upper and end side surfaces of said gate electrode and said silicon nitride film being provided on the oxidized upper and end side surfaces of said first conductive layer of said gate electrode and being extended to cover an adjacent end side surface and upper corner surface of said second conductive layer of a corresponding pixel electrode, thereby to effect electrical isolation at least between said gate electrode and the source and drain electrodes of said thin film transistor and between said gate electrode and said corresponding pixel electrode.

2. An active matrix display device according to claim 1, wherein said first electrode of said storage capacitor and said gate electrode of said thin film transistor corresponding to each picture cell are formed of a same metal layer.

3. An active matrix display device according to claim 2, wherein the gate insulator of said thin film transistor and the dielectric insulator of said storage capacitor of each picture cell are formed of said composite insulator layer, respectively.

4. An active matrix display device according to claim 3, wherein said metal layer is formed of one of aluminum and tantalum.

5. An active matrix display device according to claim 4, wherein said gate surface oxide film is an anodized oxide film.

6. An active matrix display device according to claim 5, wherein said anodized oxide film is of a lower thickness than said silicon nitride film.

7. An active matrix display device according to claim 6, wherein said pixel electrode, said gate electrode and said first electrode of said storage capacitor of each picture cell are formed on a common plane.

8. An active matrix display device according to claim 7, wherein said second conductive layer corresponding to said pixel electrode, in each picture cell, includes a transparent conductive layer.

9. An active matrix display device according to claim 8, wherein said transparent conductive layer consists of indium-tin-oxide.

10. An active matrix display device according to claim 6, wherein said source and drain electrodes and said second electrode of said storage capacitor are formed of a same composite layer consisting solely of two conductive layers.

11. An active matrix display device according to claim 10, wherein said composite layer for forming said second electrode of said storage capacitor and said source and drain electrodes consists of a first layer of chromium and a second, higher-level layer of aluminum formed thereon.

12. An active matrix display device according to claim 6, wherein said anodized oxide film is also provided at each location of a crossover portion of a scanning line and a video signal line of said display device, each said scanning line being integrally formed with gate electrodes of thin film transistors of a corresponding row of picture cells and consisting of a metal layer.

13. An active matrix display device according to claim 7, wherein said first conductive layer and said second conductive layer corresponding to each picture cell are formed on a common plane.

14. An active matrix display device according to claim 13, wherein said metal layer is formed of one of aluminum and tantalum.

15. An active matrix display device according to claim 13, wherein said gate surface oxide film is an anodized oxide film.

16. An active matrix display device according to claim 1, wherein said gate surface oxide film is of a lower thickness than said silicon nitride film.

17. An active matrix display device according to claim 16, wherein said gate insulator of said thin film transistor and said dielectric insulator of, said storage capacitor of each picture cell are formed of said, composite insulator layer, respectively.

18. An active matrix display device according to claim 17, wherein said first electrode of said storage capacitor and said gate electrode of said thin film transistor corresponding to each picture cell are formed of a same metal layer.

19. An active matrix display device according to claim 17, wherein said pixel electrode, said gate electrode and said first electrode of said storage capacitor of each picture cell are formed on a common plane.

20. An active matrix display device according to claim 1, wherein said gate electrode is an aluminum layer, and wherein said gate surface oxide film is an anodized oxide film of aluminum.

21. An active matrix display device according to claim 20, wherein said anodized oxide film is of a lower thickness than said silicon nitride film.

22. An active matrix display device according to claim 1, wherein said source and drain electrodes are formed of a same composite layer consisting solely of two conductive layers.

23. An active matrix display device according to claim 22, wherein said composite layer for forming said source and drain electrodes consists of a first layer of chromium and a second, higher-level layer of aluminum formed thereon.

24. An active matrix-display device according to claim 1, wherein said first electrode of said storage capacitor includes a third conductive layer and said second electrode thereof includes a fourth conductive layer electrically contacting a corresponding said pixel electrode at an upper surface of said second conductive layer, said fourth conductive layer being a higher-level layer than said third conductive layer and said dielectric insulator being interposed between said third and fourth conductive layers, and wherein said dielectric insulator is provided to cover both an upper surface and end side surfaces of said third conductive layer and is extended to cover an adjacent end side surface and upper corner surface of said second conductive layer of said corresponding pixel electrode.

25. An active matrix display device according to claim 24, wherein said gate insulator of said thin film transistor and said dielectric insulator of said storage capacitor of each picture cell are formed of said composite insulator layer, respectively.

26. An active matrix display device according to claim 24, wherein said first conductive layer and said third conductive layer are formed of a same metal layer.

27. An active matrix display device according to claim 26, wherein said gate surface oxide film is an anodized oxide film of said metal layer.

28. An active matrix display device according to claim 27, wherein said anodized oxide film is of a lower thickness than said silicon nitride film.

29. An active matrix display device according to claim 28, wherein said anodized oxide film is also provided at each location of a crossover portion of a scanning line and a video signal line of said display device, each said scanning line being integrally formed with gate electrodes of thin film transistors of a corresponding row of picture cells and consisting of a metal layer.

30. An active matrix display device according to claim 1, wherein said gate surface oxide film is also provided at each location of a crossover portion of a scanning line and a video signal line of said display device, each said scanning line being integrally formed with gate electrodes of thin film transistors of a corresponding row of picture cells and consisting of a metal layer.

31. An active matrix display device, comprising:
at least one row and at least one column of picture cells provided over a transparent substrate, each picture cell being coupled to a scanning line and a video signal line, and each picture cell including a pixel electrode, a thin film transistor, having drain, source and gate electrodes, and a storage capacitor, said pixel electrode being electrically connected to one of the source and drain electrodes of said thin film transistor and to an electrode corresponding to said storage capacitor, and said video signal line being extended adjacent the other of said source and drain electrodes over spacings between adjacent picture cells in the row direction,
wherein said thin film transistor is comprised of a gate electrode corresponding to a first conductive layer, a gate insulator provided on said gate electrode, a channel region provided above said gate electrode and including an amorphous silicon layer provided on said gate insulator, and the source and drain electrodes of said thin film transistor are provided at laterally opposing ends of said channel region,
wherein said pixel electrode is comprised of a second conductive layer,
wherein said storage capacitor is comprised of a first electrode, a second electrode and a dielectric insulator interposed between the first and second electrodes, and
wherein the gate insulator of said thin film transistor is formed of a composite insulator layer including a gate surface oxide film, formed by oxidation of said gate electrode, and a silicon nitride film thereon, said gate surface oxide film being formed to cover upper and end side surfaces of said gate electrode and said silicon nitride film being provided on the oxidized upper and end side surfaces of said first conductive layer of said gate electrode and being extended to cover an adjacent end side surface and upper corner surface of said second conductive layer of a corresponding pixel electrode and an adjacent end side surface and upper corner surface of another, second conductive layer corresponding to a pixel electrode of an adjacently disposed picture cell in a row direction, thereby to effect electrical isolation between said gate electrode and the source and drain electrodes of said thin film transistor, between said gate electrode and said corresponding pixel electrode and between said video signal line, which is extended over the gate insulator of a column of picture cells, and both the gate electrode of each said thin film transistor of a corresponding column of picture cells and the second conductive layer corresponding to pixel electrodes of another column of picture cells adjacent thereto.

32. An active matrix display device according to claim 31, wherein each row of picture cells and each column of picture cells constitutes a straight-lined array of picture cells, respectively.

33. An active matrix display device according to claim 31, wherein spacings between said gate electrode and said second conductive layer of a corresponding pixel electrode and between said gate electrode and another, said second conductive layer of a pixel electrode of an adjacently disposed picture cell, in a row direction, are each defined by the sum of the horizontal thickness of the gate surface oxide film, on an end side surface of said gate electrode, and of the silicon nitride film on an adjacent end side surface thereto of the second conductive film.

34. An active matrix display device according to claim 31, wherein said gate insulator of said thin film transistor and said dielectric insulator of said storage capacitor of each picture cell are formed of said composite insulator layer, respectively.

35. An active matrix display device according to claim 31, wherein said gate surface oxide film is of a lower thickness than said silicon nitride film.

36. An active matrix display device according to claim 31, wherein said first electrode of said storage capacitor includes a third conductive layer and said second electrode thereof includes a fourth conductive layer electrically contacting said pixel electrode, of a corresponding picture element, at an upper surface of said second conductive layer, said fourth conductive layer being a higher-level layer than said third conductive layer and said dielectric insulator being interposed between said third and fourth conductive layers.

37. An active matrix display device according to claim 36, wherein said gate insulator of said thin film transistor and said dielectric insulator of said storage capacitor of each picture cell are formed of said composite insulator layer, respectively.

38. An active matrix display device according to claim 37, wherein said gate surface oxides film is of a lower thickness than said silicon nitride film.

39. An active matrix display device according to claim 38, wherein said first conductive layer and said third conductive layer are formed of a same metal layer.

40. An active matrix display device according to claim 39, wherein said metal layer is formed of one of aluminum and tantalum.

41. An active matrix display device according to claim 40, wherein said gate surface oxide film is an anodized oxide film of said one of aluminum and tantalum.

42. An active matrix display device according to claim 39, wherein said gate surface oxide film is an anodized oxide film of said metal layer.

43. An active matrix display device according to claim 42, wherein said metal layer is formed of aluminum.

44. An active matrix display device according to claim 42, wherein said metal layer is formed of tantalum.

45. An active matrix display device according to claim 44, wherein said first, second and third conductive layers, consisting of said gate electrode of said thin film transistor, said pixel electrode and said first electrode of said storage capacitor of each picture cell, respectively, are formed on a common plane.

46. An active matrix display device according to claim 42, wherein said first conductive layer and said second conductive layer corresponding to each picture cell are formed on a common plane.

47. An active matrix display device according to claim 46, wherein said video signal line corresponding to each column of picture cells is extended as part of a same layer as that for forming said source and drain electrodes.

48. An active matrix display device according to claim 47, wherein said fourth conductive layer and said source and drain electrodes of said thin film transistor of each and every picture cell of said display device are formed of a same conductive layer.

49. An active matrix display device according to claim 48, wherein the conductive layer for forming said second electrode of said storage capacitor, said video signal line and said source and drain electrodes is a composite layer consisting solely of two conductive layers.

50. An active matrix display device according to claim 49, wherein said composite layer for forming said second electrode of said storage capacitor, said video signal line and said source and drain electrodes consists of a first layer of chromium and a second, higher-level layer of aluminum formed thereon.

51. An active matrix display device according to claim 50, wherein said layer of aluminum has a narrower width than that of said layer of chromium, in said composite layer.

52. An active matrix display device according to claim 51, wherein said layer of chromium is of lower thickness than that of said layer of aluminum, at least in portions of said composite layer corresponding to said video signal line and said source and drain electrodes.

53. An active matrix display device according to claim 36, wherein said first conductive layer and said second conductive layer corresponding to each picture cell are formed on a common plane.

54. An active matrix display device according to claim 53, wherein said fourth conductive layer and said source and drain electrodes of said thin film transistor of each and every picture cell of said display device are formed of a same conductive layer.

55. An active matrix display device according to claim 54, wherein said fourth conductive layer for forming said second electrode of said storage capacitor and said source and drain electrodes is a composite layer consisting solely of two conductive layers.

56. An active matrix display device according to claim 55, wherein said composite layer for forming said second electrode of said storage capacitor and said source and drain electrodes consists of a first layer of chromium and a second, higher-level layer of aluminum formed thereon.

57. A active matrix display device according to claim 56, wherein said video signal line corresponding to each column of picture cells is extended as part of a same layer as that for forming said source and drain electrodes.

58. An active matrix display device according to claim 57, wherein said layer of aluminum has a narrower width than that of said layer of chromium, in said composite layer.

59. An active matrix display device according to claim 58, wherein said layer of chromium is of lower thickness than that of said layer of aluminum, at least in portions of said composite layer corresponding to said video signal line and said source and drain electrodes.

60. An active matrix display device according to claim 31, wherein said source and drain electrodes are formed of a same composite layer consisting solely of two conductive layers.

61. An active matrix display device according to claim 60, wherein said composite layer for forming said source and drain electrodes consists of a first layer of chromium and a second, higher-level layer of aluminum formed thereon.

62. An active matrix display device according to claim 61, wherein said video signal line corresponding to each column of picture cells is extended as part of a same layer as that for forming said source and drain electrodes.

63. An active matrix display device according to 62, wherein said layer of aluminum has a narrower width than that of said layer of chromium, in said composite layer.

64. An active matrix display device according to claim 63, wherein said layer of chromium is of lower thickness than that of said layer of aluminum, in said composite layer.

65. An active matrix display device according to claim 31, wherein said first electrode of said storage capacitor includes a third conductive layer and said second electrode thereof includes a fourth conductive layer electrically contacting a corresponding said pixel electrode at an upper surface of said second conductive layer, said fourth conductive layer being a higher-level layer than said third conductive layer and said dielectric insulator being interposed between said third and fourth conductive layers, and wherein said dielectric insulator is provided to cover both an upper surface and end side surfaces of said third conductive layer and is extended to cover an adjacent end side surface and upper corner surface of said second conductive layer of said corresponding pixel electrode.

66. An active matrix display device according to claim 65, wherein said gate insulator of said thin film transistor and said dielectric insulator of said storage capacitor of each picture cell are formed of said composite insulator layer, respectively.

67. An active matrix display device according to claim 66, wherein said first conductive layer and said third conductive layer are formed of a same metal layer.

68. An active matrix display device according to claim 67, wherein said gate surface oxide film is an anodized oxide film of said metal layer.

69. An active matrix display device according to claim 68, wherein said anodized oxide film is of a lower thickness than said silicon nitride film.

70. An active matrix display device according to claim 31, wherein said gate surface oxide film is also provided at each location of a crossover portion of a scanning line and a video signal line of said display device, each said scanning line being integrally formed with gate electrodes of thin film transistors of a corresponding row of picture cells and consisting of a metal layer.

* * * * *